July 16, 1940.  E. W. GOODWIN  2,208,304
SHEET FEEDING APPARATUS
Filed April 15, 1939  9 Sheets-Sheet 2

INVENTOR
EDWIN W. GOODWIN
BY
J. A. Hobson Jr.
ATTORNEY

INVENTOR
EDWIN W. GOODWIN
BY J. A. Hobson Jr.
ATTORNEY

July 16, 1940. E. W. GOODWIN 2,208,304
SHEET FEEDING APPARATUS
Filed April 15, 1939 9 Sheets-Sheet 5
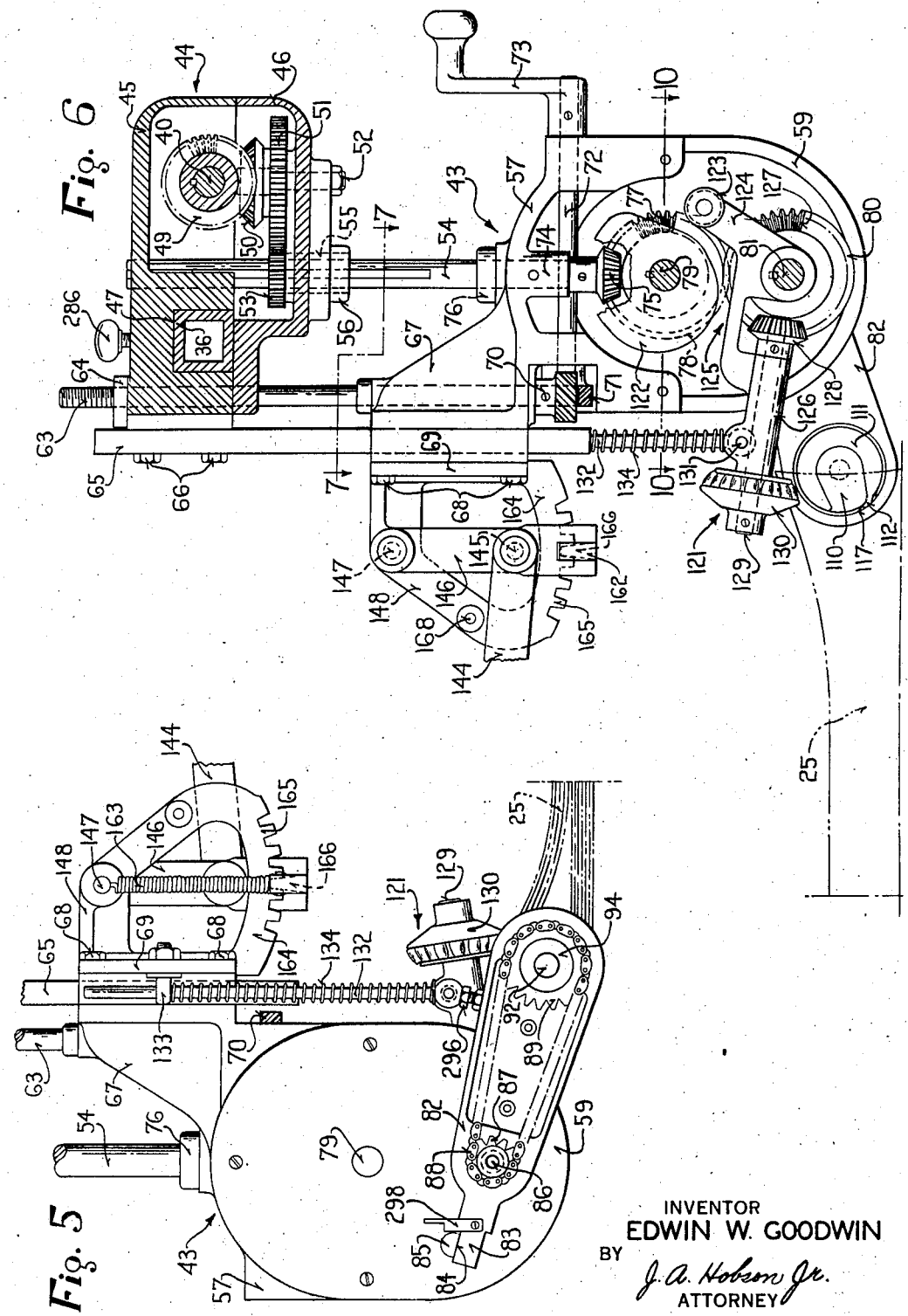
INVENTOR
EDWIN W. GOODWIN
BY
J. A. Hobson Jr.
ATTORNEY

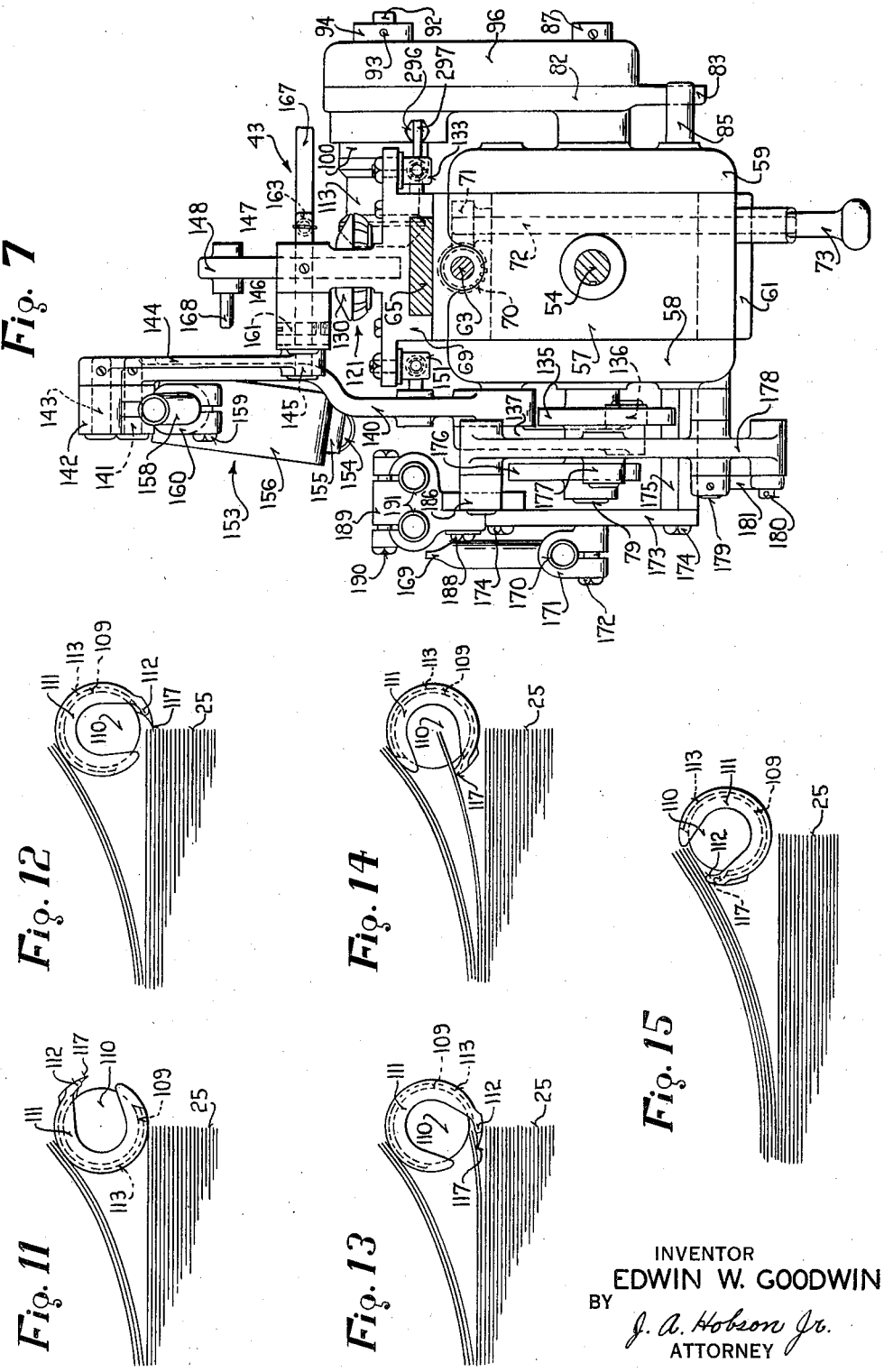

July 16, 1940.  E. W. GOODWIN  2,208,304
SHEET FEEDING APPARATUS
Filed April 15, 1939  9 Sheets-Sheet 7
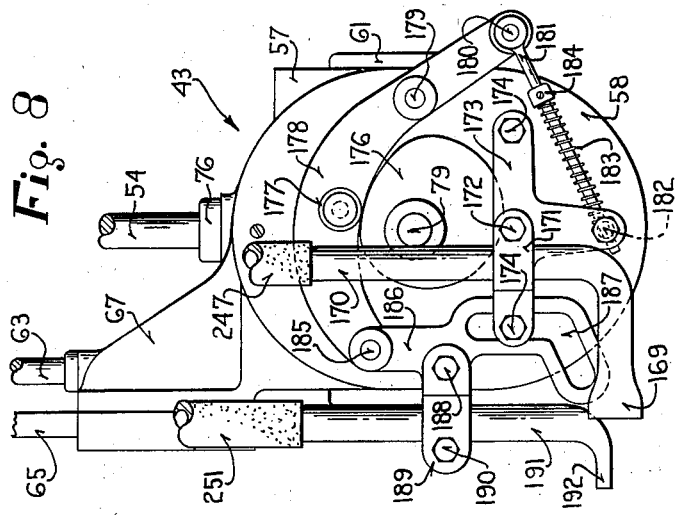
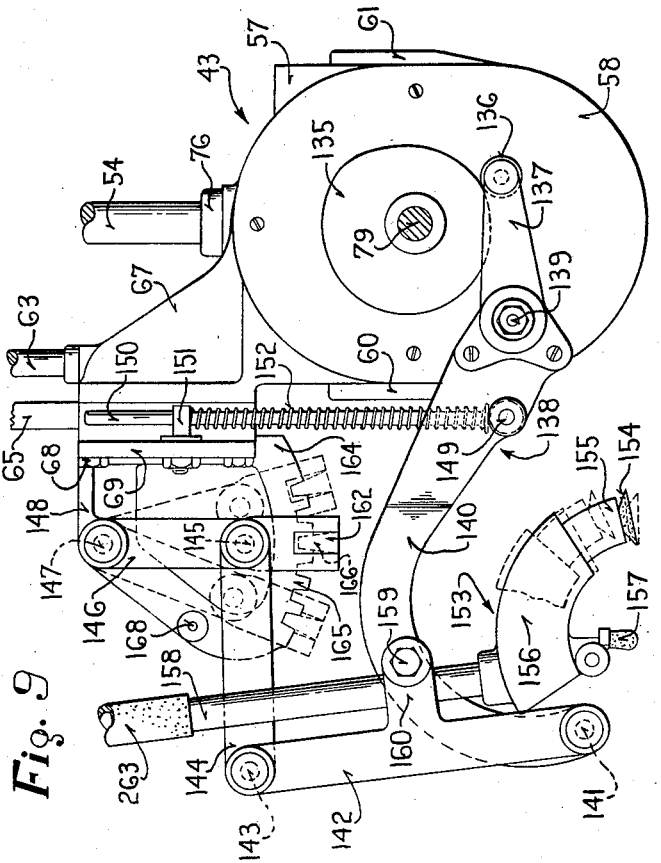
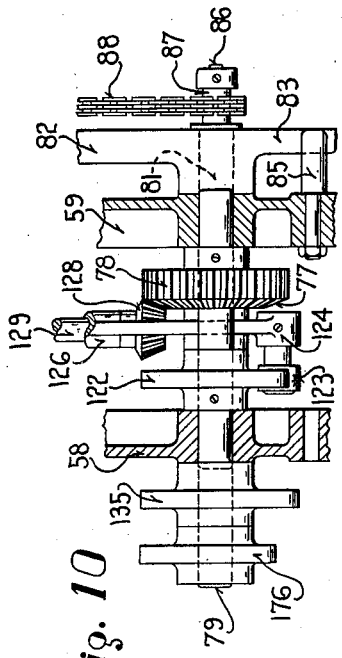
INVENTOR
EDWIN W. GOODWIN
BY J. A. Hobson Jr.
ATTORNEY July 16, 1940.  E. W. GOODWIN  2,208,304
SHEET FEEDING APPARATUS
Filed April 15, 1939   9 Sheets-Sheet 8
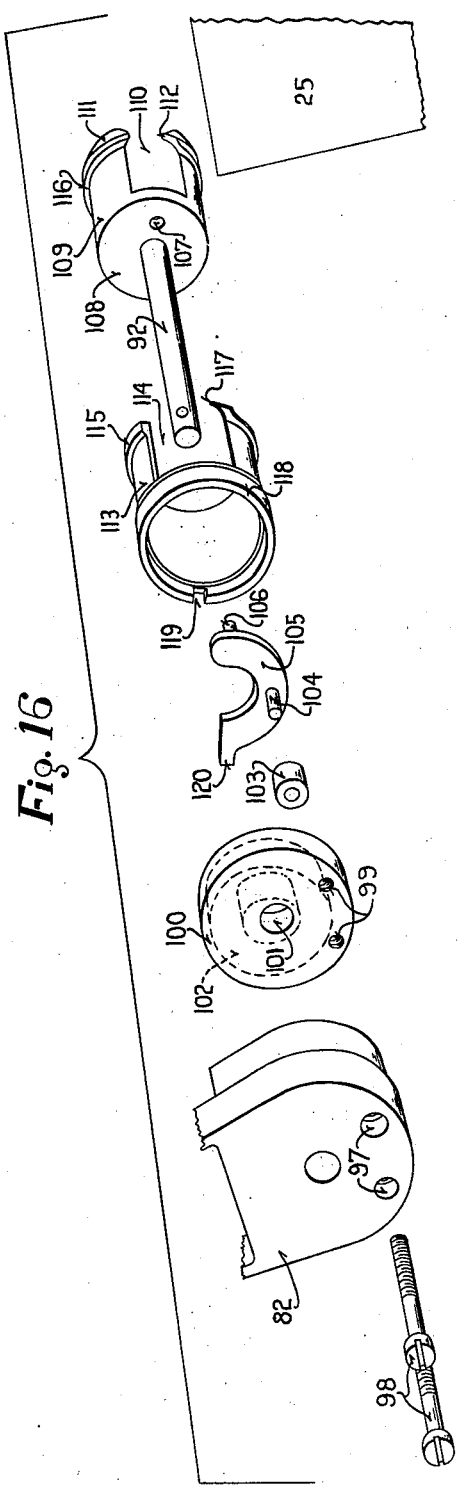
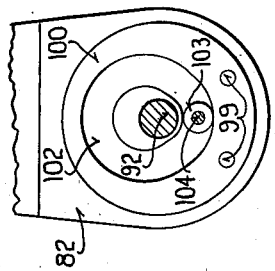
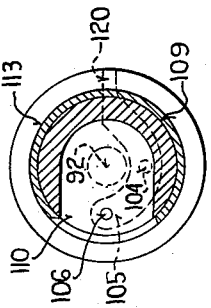
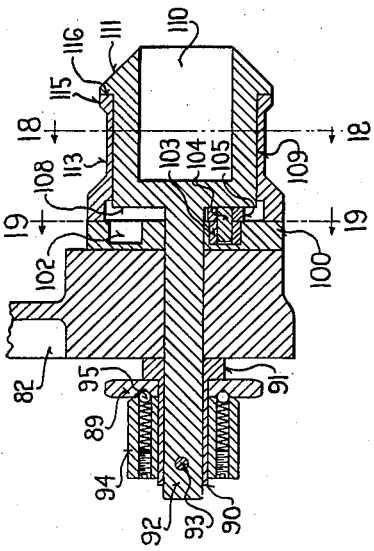
INVENTOR
EDWIN W. GOODWIN
BY
J. A. Hobson Jr.
ATTORNEY July 16, 1940.  E. W. GOODWIN  2,208,304
SHEET FEEDING APPARATUS
Filed April 15, 1939   9 Sheets-Sheet 9

INVENTOR
EDWIN W. GOODWIN
BY  J. A. Hobson Jr.
ATTORNEY

Patented July 16, 1940

2,208,304

UNITED STATES PATENT OFFICE 2,208,304

SHEET FEEDING APPARATUS

Edwin W. Goodwin, New Rochelle, N. Y., assignor to Dexter Folder Company, Pearl River, N. Y., a corporation of New York Application April 15, 1939, Serial No. 267,963

47 Claims. (Cl. 271—20)

This invention relates to sheet feeders and more particularly to the sheet separating mechanisms employed in the feeding of sheets from a supply or pile thereof carried on the feeder.

In United States Patent No. 1,475,621 granted November 27, 1923, there is disclosed sheet separating mechanism including rotary pick-ups for lifting and continuously maintaining in lifted condition upper rear corners of a pile or supply of sheets, in order to facilitate separation and forwarding of the sheets in succession from the supply by the sheet separating and forwarding devices. These rotary pick-ups or lifters have heretofore been very satisfactory in actual practice and for many years have been standard parts of a widely used commercial embodiment of the invention disclosed and claimed in the patent above referred to.

In some cases, however, and more particularly with reference to certain grades of paper, it was found that the rotary pick-ups or lifters when operating in the supply of sheets would scratch, nick, or otherwise disfigure the sheets. In view of the increasingly rigid requirements of the trade in recent years for better and more perfect work, this scratching, nicking, or disfiguring of the sheets has resulted in serious objection thereto by the trade because of the necessity for discarding such disfigured sheets with resulting losses in time, materials, production and profits.

It is accordingly one object of the present invention to provide improved means for separating and continuously maintaining in separated condition a portion or portions of a supply of sheets without in any way marking or disfiguring them, thus overcoming the objections above referred to. Another object of the present invention is to provide improved mechanism for separating and continuously maintaining in separated condition a portion or portions of a supply of sheets and which mechanism is so constructed and operated that the separation may be effected without damage to the sheets by relatively advancing and retracting certain elements by which the separation is effected.

In the United States Patent No. 1,475,621 above referred to there is also disclosed sheet combing means and pneumatic sheet separating means acting in conjunction with the rotary pick-ups to separate the sheets one from another in succession preparatory to forwarding them in like manner to the printing press or other machine to be fed. These devices have also generally worked very well in the widely used commercial embodiment of the invention disclosed in said patent.

It has been found, however, that sometimes adjustment of the pneumatic sheet separating means has been necessary after the feeder has been started and this has required stopping of the feeder in order to make the necessary adjustments of said sheet separating means. Accordingly, it is another object of the present invention to provide improved sheet separating mechanism of the type specified and wherein adjustment of the pneumatic sheet separating means to obtain the best and most accurate separation can be made while the feeder is in operation.

Further objects of the present invention are to provide improvements in the arrangement, driving, adjustability, and operation of the pneumatic devices employed in sheet feeders to separate and forward the sheets and which improvements enable said devices to be readily moved to different operative positions without disturbing the driving and pneumatic connections for the respective devices with their sources of power, vacuum, and air under pressure.

These and other objects of the present invention will appear as the following description thereof proceeds and in order to more clearly understand said invention one embodiment thereof is illustrated in the accompanying drawings in which:

Fig. 5 is an enlarged side elevation of one of the sheet separating mechanisms shown in Fig. 2 looking from the right thereof;

Fig. 6 is a vertical longitudinal sectional view of said sheet separating mechanism and driving means for movable parts thereof;

Fig. 7 is a horizontal sectional view on the line 7—7 of Fig. 6;

Fig. 8 is a side elevation of pile and sheet winding means shown in Fig. 7 looking from the left thereof;

Fig. 9 is a view similar to Fig. 8 showing sheet separating means and adjusting means therefor and omitting the pile and sheet winding means;

Fig. 10 is a fragmentary horizontal sectional view on the line 10—10 of Fig. 6;

Figure 24:
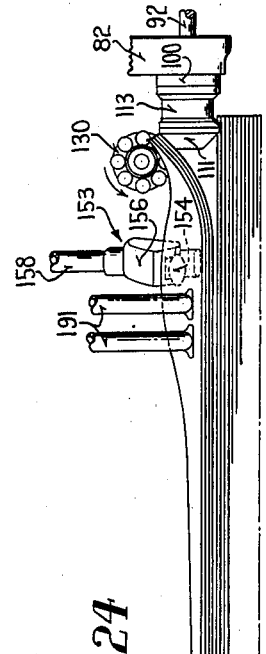

Figs. 11 to 15 inclusive are diagrammatic side elevations of sheet supply or pile corner separating means in successive positions of operation thereof;

Fig. 16 is an enlarged detail perspective view of the supply or pile corner separating means with elements thereof spread apart for purposes of clearer illustration;

Fig. 17 is an enlarged fragmentary vertical sectional view of the supply or pile corner separating means;

Figs. 18 and 19 are vertical sectional views on the lines 18—18 and 19—19 respectively of Fig. 17;

Figs. 20 to 23 inclusive are diagrammatic rear elevations of the sheet separating mechanism showing successively different positions of the parts during one cycle of operation of said mechanism; and Fig. 24 is a diagrammatic rear elevation of the sheet separating mechanisms showing their location at opposite rear corners of the supply and the positions of the parts preparatory to completion of separation of the top sheet from the one below.

Referring to the drawings, wherein like reference characters designate like parts throughout the several views, the various movable parts of the feeder, as well as certain stationary parts thereof, are all mounted on a frame best shown in Figs. 1 to 4, inclusive, of said drawings. Said frame is comprised by front uprights 5 and rear uprights 6, the front uprights 5 having heads 7 bolted or otherwise suitably secured thereto and the rear uprights 6 having heads 8 bolted or otherwise suitably secured thereto. The heads 7 and 8, in turn, have side members 9 and 10 bolted or otherwise suitably secured thereto. The front heads 7 are connected together by a channel member 11 bolted or otherwise suitably secured thereto, and the rear heads 8 are connected together by a stay shaft 12 bolted or otherwise suitably secured thereto.

Extending transversely of the feeder and driven from any suitable source of power is a shaft 13 each end of which is journalled in a bracket 14 (Fig. 1) bolted or otherwise suitably secured on the adjacent head 7. This shaft 13 carries on each end thereof a worm 15 located in a suitable opening in the adjacent head 7 in which is also located a worm gear 16 which meshes with and is driven by the adjacent worm 15.

Extending longitudinally of the feeder near the top and at opposite sides thereof are shafts 17 (Figs. 1 and 2) each having fixed thereon a worm gear 16 and said shafts are journalled in suitable bearings on the feeder frame. Fixed on the shafts 17 are sheaves 18 provided with teeth that are engaged by the links of chains 19 which pass over said sheaves and have corresponding ends attached by couplings 20 to the side bars 21 of a pile elevator including said chains. This elevator also includes beams 22 extending transversely of the feeder and supported on the side bars 21. The beams 22 are provided at the tops thereof with anti-friction bearings 23 and said elevator is constructed to receive and support a pile board 24 and a pile of sheets 25 thereon. The pile board rests on the anti-friction bearings 23 so that said board and pile of sheets may be readily adjusted sidewise on the elevator.

The elevator may be lowered to load it, and raised to bring the top of the pile to proper position for feeding, by any suitable means for these purposes. Shaft 13 is then intermittently rotated in the usual manner by any well known means to raise the elevator step by step in order to maintain the top of the pile at the proper level as the sheets are fed therefrom in succession by means for this purpose hereinafter described. The construction of the pile elevator and its operation for purposes of loading and feeding sheets are well understood in the art and since the elevator per se forms no part of the present invention further description thereof is unnecessary. It is pointed out, however, that during step by step upward movement of the elevator imparted thereto as sheets are being fed off the top of the pile, the front of the pile is guided by pile guides 26 (Fig. 1) and the topmost sheets are jogged by fingers 27 (Figs. 1 and 4) during the intervals between feeding of each sheet from the top of the pile. The pile guides 26 are secured in any suitable manner on the feeder frame and the jogger fingers 27 are mounted and operated in any suitable manner.

Figure 1:
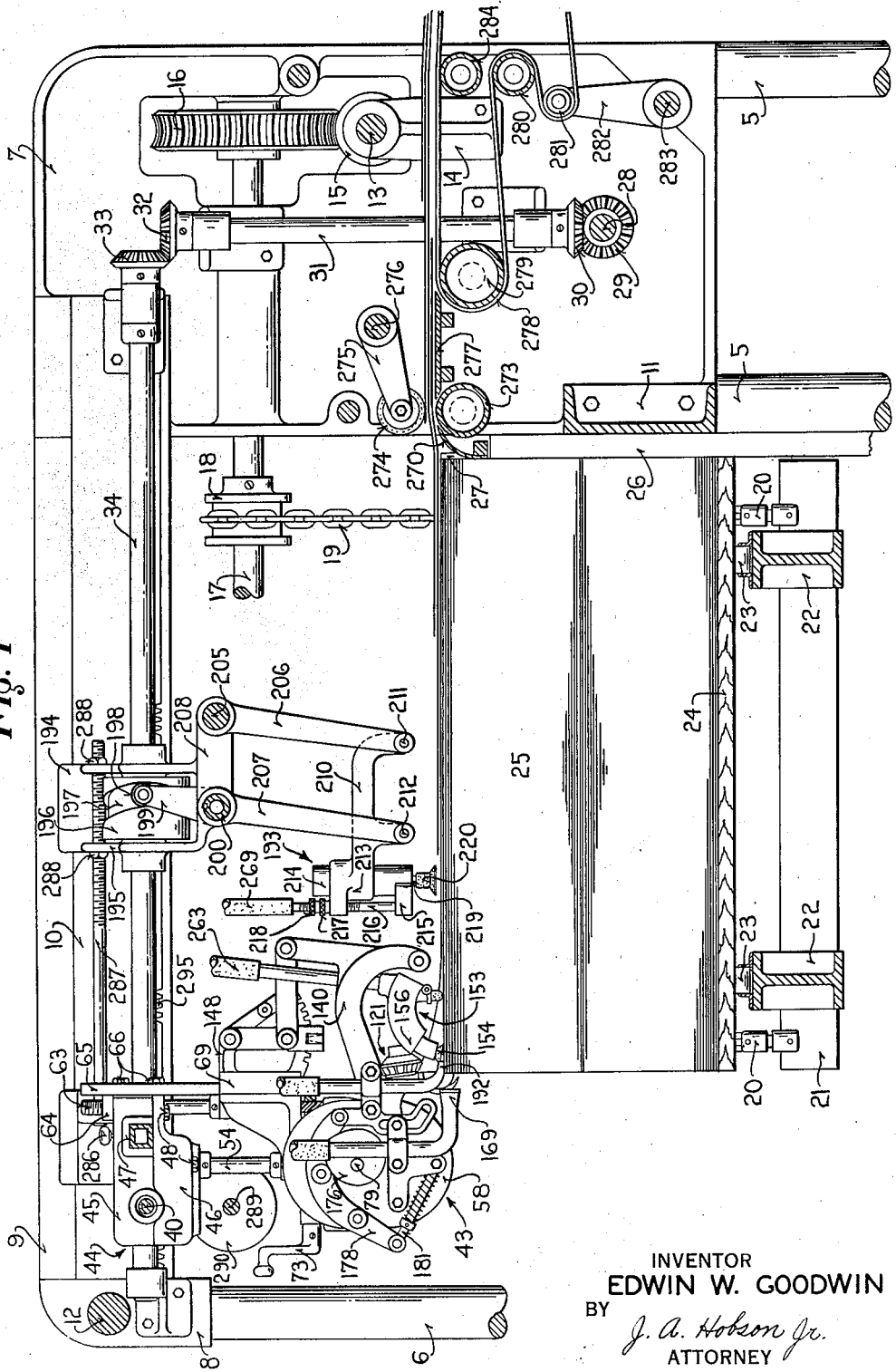
Fig. 1 is a fragmentary vertical longitudinal sectional view of a sheet feeder constructed in accordance with the present invention.
Figure 4:
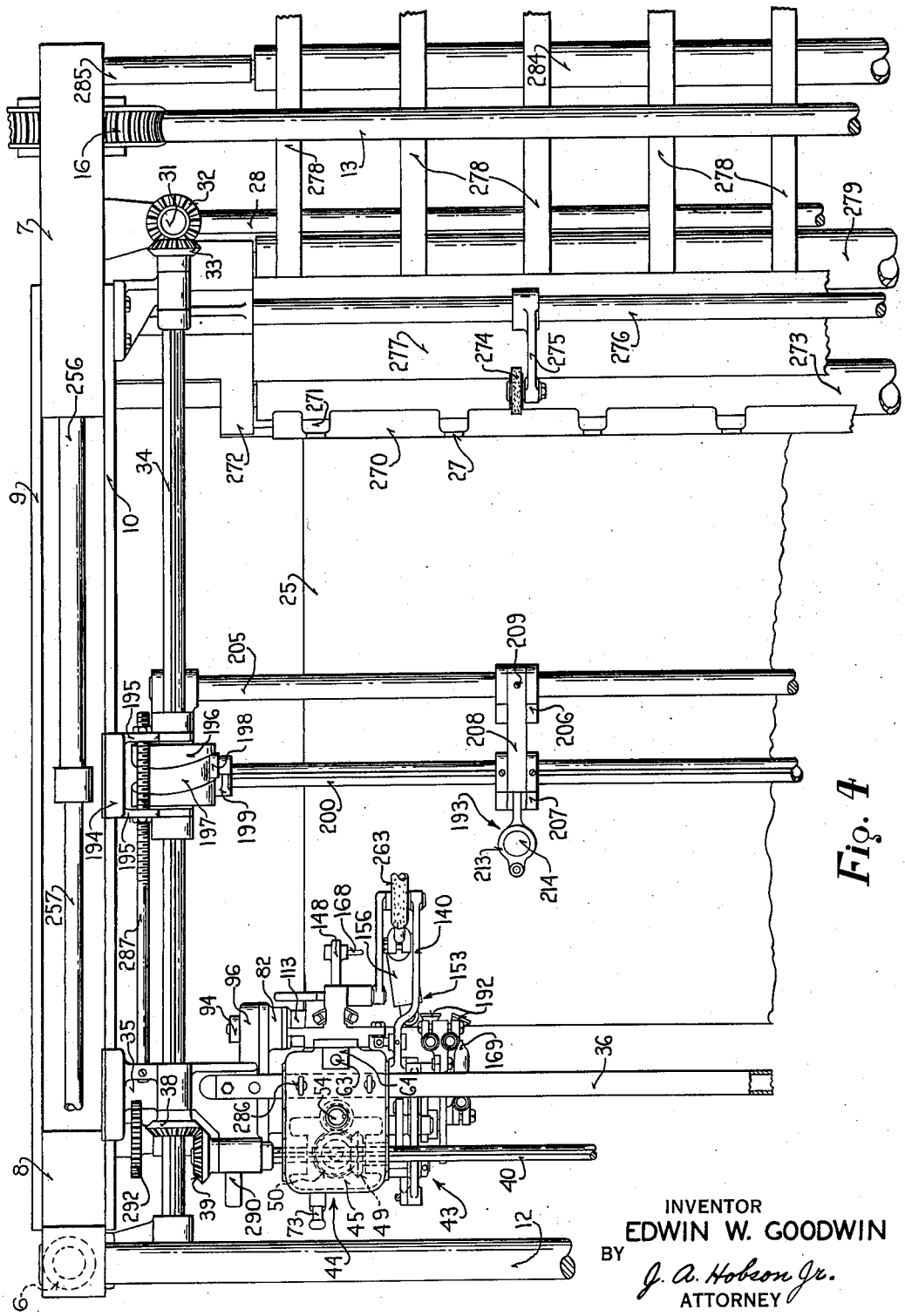
Fig. 4 is a fragmentary top plan view, with parts omitted for purposes of clearer illustration, showing sheet separating and forwarding devices and operating means therefor.

The sheet separating mechanisms hereinafter referred to have certain mechanically actuated parts which, of course, require mechanism for driving and operating them and said mechanism is preferably comprised by the following instrumentalities. Extending transversely of the feeder and driven in any suitable manner is a shaft 28 the opposite ends of which are journalled in suitable bearings on the front heads 7 (Figs. 1 and 4). This shaft 28 has fixed thereon a bevel gear 29 which meshes with a similar gear 30 that is fixed on the lower end of a vertical shaft 31 journalled at one side of the feeder in suitable bearings on one of the front heads 7. The vertical shaft 31 has fixed on the upper end thereof a bevel gear 32 which meshes with a similar gear 33 that is fixed on the forward end of a horizontally extending shaft 34 located at the top and one side of the feeder and journalled in suitable bearings on one of the side members 10 and one of the rear heads 8.

Slidably mounted on the shaft 34 and also on one of the side members 10 is a bracket 35 which has bolted or otherwise suitably secured thereto a hollow square bar 36 (Figs. 1, 3 and 4) that extends transversely of the feeder and is bolted or otherwise suitably secured to a bracket 37 that is slidably mounted on the other side member 10. Keyed to the shaft 34 and slidable therealong with the bracket 35 is a bevel gear 38 (Fig. 4) which meshes with a similar gear 39. This gear 39 is fixed on a cross shaft 40 journalled in a suitable bearing on the bracket 35.

Figure 2:
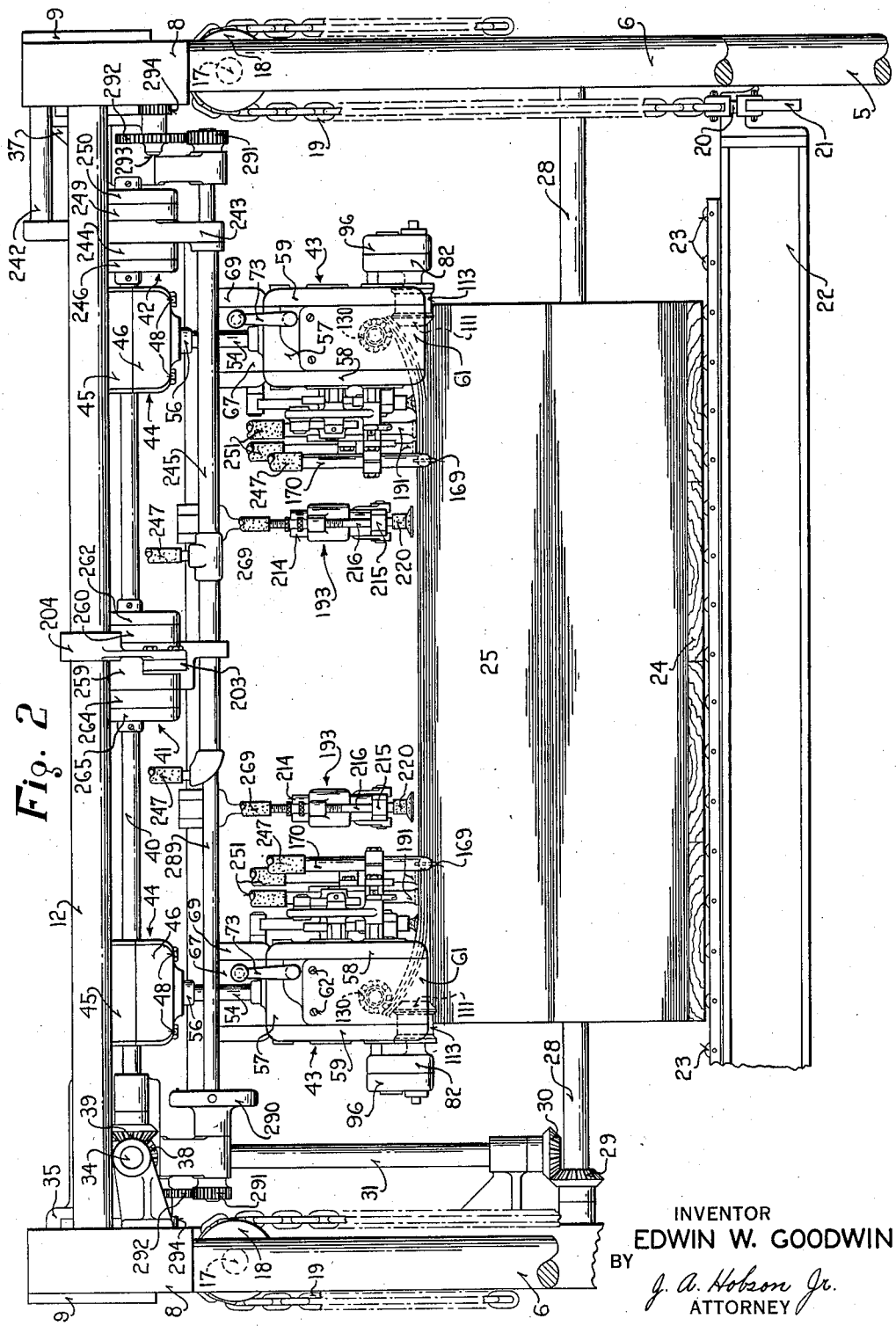
Fig. 2 is a fragmentary rear elevation of the feeder shown in Fig. 1.
Figure 3:
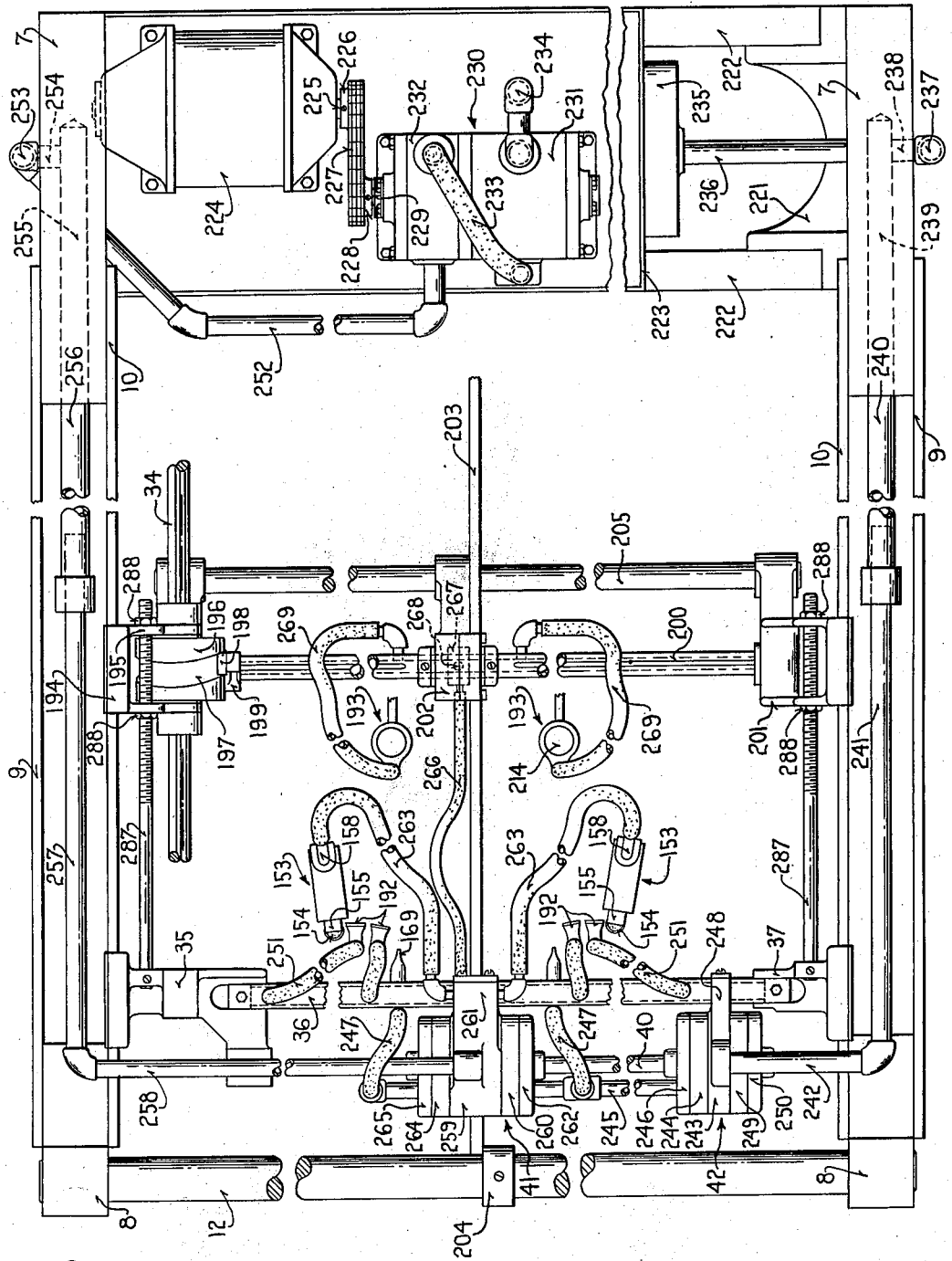
Fig. 3 is a top plan view of said feeder, with parts omitted and broken away for purposes of clearer illustration, showing pneumatic supply and control devices.

The cross shaft 40 extends through and is journalled in rotary valve mechanisms indicated broadly at 41 and 42 which are mounted on the hollow cross bar 36 and secured thereto in any suitable manner (Figs. 2 and 3). These valve mechanisms will be hereinafter described and their rotating parts are driven by the shaft 40. The sheet separating mechanisms, indicated broadly at 43 in Figs. 1, 2 and 4 to 9 inclusive of the drawings, are located one adjacent each rear upper corner of the supply or pile of sheets 25 and are mounted on and adjustable along the hollow cross bar 36 for operation on sheets of different widths. The mechanically actuated parts of the sheet separating mechanisms 43 are connected with and operated by power transmission units indicated broadly at 44 which units, in turn, are driven by the shaft 40 and are mounted on and adjustable along the hollow cross bar 36.

As herein shown, there are two power transmission units 44 located adjacent upper rear corners of the pile of sheets 25 for operating two sheet separating mechanisms similarly located and since the constructions of the two units 44 are identical a description of one will suffice for both. Each power transmission unit 44 is enclosed in a two part housing the upper member of which is indicated at 45 and the lower member of which is indicated at 46 (Figs. 1, 4 and 6). The upper housing member 45 fits over and is supported on the hollow cross bar 36 and for this purpose said housing member is provided with a square slot 47 to receive said bar. The lower housing member 46 is bolted or otherwise suitably secured, as shown at 48 in Fig. 1, to the upper housing member 45 under the hollow cross bar 36.

Each power transmission unit 44 includes a bevel gear 49 keyed to and slidable along the shaft 40 (Figs. 4 and 6). Bevel gear 49 is located between one side wall of the upper housing member 45 and a bevel gear 50 which meshes with said bevel gear 49. Each bevel gear 50 is secured to or formed integrally with a spur gear 51 and said gears are journalled on a vertical stud 52 extending upwardly through the lower housing member 46 and secured thereto in any suitable manner. Each spur gear 51 meshes with a spur pinion 53 that is keyed on a vertical shaft 54 slidable vertically through said spur pinion and its tubular hub 55 and also slidable through a suitable opening in the upper housing member 45. The hub 55 of each spur pinion 53 extends through a suitable opening in its lower housing member 46 and vertical displacement of the pinion is prevented by a collar 56 secured to said hub exteriorly of the lower housing member 46 and bearing against the same.

Each separating mechanism 43 is mounted on the housing of one of the power transmitting units 44 for adjustment vertically with respect thereto and also for adjustment therewith along the hollow cross bar 36. Further, vertical adjustment of the separating mechanisms 43 may be effected without disturbing driving connections between their movable parts and the power transmission units 44. Said movable parts of the separator mechanisms are enclosed in and carried by housings (Figs. 2 and 5 to 9, inclusive) each comprising a main housing member 57, end plates 58 and 59 at opposite sides of the member 57 and bolted or otherwise suitably secured thereto, and removable cover plates 60 and 61 located between the end plates 58 and 59 and removably secured, as by set screws 62 (Fig. 2), to the main housing member 57.

The housings for the transmission units 44 each have extending loosely through a suitable opening in the upper member 45 a vertical threaded shaft 63 (Figs. 1, 4, 6 and 7) which also passes through a slot formed in the forward edge of the lower housing member 46. Each shaft 63 passes through a suitable opening in and has threaded engagement with a square block 64 mounted on the upper adjacent housing member 45 and bearing against a vertical guide 65 which prevents rotation of said block when the shaft 63 is rotated to vertically adjust the separator mechanism as hereinafter described. Each guide 65 is bolted or otherwise suitably secured as at 66 to the front face of the adjacent upper housing member 45. Formed integrally with each housing member 57 is a vertical bracket 67 which bears against the rear face of the adjacent guide 65. Mounted on each guide 65 and bolted or otherwise suitably secured as at 68 on the adjacent bracket 67 is a slide 69.

It will thus appear that through the provision of the slides 69 and their connections with the brackets 67 that the separator mechanism housings and all parts carried thereby may be adjusted vertically on the guides 65. For this purpose, each shaft 63 extends loosely through a suitable opening in the adjacent bracket 67 and has fixed on its lower projecting end a spiral gear 70 located in an open recess at the top and front of the adjacent housing member 57. Also located in said opening and meshing with the spiral gear 70 of each unit 43 is a similar gear 71 that is fixed on a horizontal shaft 72 journalled in suitable bearings in the adjacent housing member 57 and projecting therethrough rearwardly thereof. Fixed on the rearwardly projecting end of each shaft 72 is a handle 73 which, when turned, drives the threaded shaft 63 and raises or lowers the entire separator mechanism in accordance with the direction of rotation of the handle 73 and through threaded engagement of the shaft 63 with the block 64.

Raising or lowering movement of each separator mechanism is accompanied by corresponding movement of its shaft 54 without disturbing the driving connections for said shaft with its power transmission unit 44 and driven parts of the corresponding separator mechanism. Accordingly, each shaft 54 extends through and is journalled in a suitable bearing provided by a boss 74 (Fig. 6) in the adjacent housing member 57 and there is fixed on said shaft within the housing a bevel gear 75 the hub of which bears against the end of said boss. There is also fixed on each shaft 54 exteriorly of its housing member 57 a collar 76 which bears against said member on the top thereof. Each bevel gear 75 meshes with a similar gear 77 (Figs. 6 and 10) compounded with a spur gear 78 that is fixed on a driven shaft 79 journalled in suitable bearings in the side plates 58 and 59 and projecting outwardly beyond the plate 58.

Each spur gear 78 meshes with a similar gear 80 that is fixed on a shaft 81. Each shaft 81 is journalled in suitable bearings in side plates 58 and 59 and one end of said shaft projects through plate 59 outwardly beyond the same. Loosely mounted on the outwardly projecting end of each shaft 81 is a plate 82 the forward end of which is retained in a definite downward position by a stop 83 formed integrally with the plate and bearing against the under, flattened side 84 of a pin 85 (Figs. 5 and 7) which projects outwardly from the side plate 59 and is secured thereto in any suitable manner. Fixed on a reduced portion 86 (Figs. 5 and 10) of each shaft 81 that projects outwardly beyond the adjacent plate 82 is a small sprocket 87 around which passes a chain 88 that also passes around a somewhat larger sprocket 89.

Each sprocket 89 is loosely mounted on a sleeve 90 (Fig. 17) provided with a head 91 bearing against the adjacent plate 82 and spacing said sprocket therefrom. Each sleeve 90 is fixed on a shaft 92 journalled in a suitable bearing in the forward end of the adjacent plate 82 and projecting therethrough at both sides thereof. Mounted on each sleeve 90 and fixed thereto by a pin 93 that also fixes said sleeve to the shaft 92, is a slip clutch 94 having spring pressed ball elements 95 yieldably engaged in suitable recesses in the outer face of the adjacent sprocket 89 so that the latter is normally rotated upon rotation of its shaft 81 but can slip relative thereto upon undue obstruction to rotation thereof. Each plate 82 has a cover 96 (Fig. 7) removably secured thereto in any suitable manner and providing therewith a housing for the adjacent sprockets 87 and 90 and chain 88. The hub of each sprocket 87 and the adjacent ball carrying member of the slip clutch 94 project outwardly through suitable openings in the cover 96 and are secured to the shaft 81 and the sleeve 90 which, together with the shaft 92, also project outwardly through said openings.

In accordance with the present invention means are provided for separating and continuously maintaining in separated condition portions of the supply or pile of sheets from the remainder thereof in such manner as to prevent scratching or marring of the sheets while at the same time enabling them to be separated and forwarded singly in a rapid and efficient manner. Said means are preferably mounted, constructed and operated as follows. Each plate 82 is provided in its forward end with openings 97 (Fig. 16) through which extend screws 98 threaded in suitable threaded openings 99 of a box cam 100 and serving to secure said cam in stationary position on the inner face of the forward end of said plate. The shaft 92 (Figs. 16 to 19, inclusive) projects loosely through a suitable opening 101 formed in the fixed box cam 100 centrally thereof, and the cam groove 102 of said cam has extending therein a roller 103 that is journalled on a pin 104 of a cam lever 105.

The cam lever 105 is provided with a pin 106 forming a pivot therefor and journalled in a suitable opening 107 formed in a solid end 108 of a substantially cylindrical sheet separating or lifting member 109 that is secured to or formed integrally with the shaft 92 and is rotated thereby. The member 109 is slotted or hollowed out through its inner end and a portion of its periphery to provide a sheet receiving pocket 110 for the sheets as they are separated or lifted from the supply by said member in a manner to be presently described. The member 109 is further provided with an enlarged segmental truncated end 111 slotted axially in coincidence with the pocket 110 and having a rounded or unsharpened sheet separating or lifting point 112.

The member 109 has mounted thereon for rotation therewith and relatively thereto a sleeve 113 provided therein with a slot 114 coincident with the pocket 110 formed in the member 109. A segmental enlargement 115 of the sleeve 113 bears against a shoulder 116 formed by the truncated end 111 of the member 109. The segmental enlargement 115 is provided with a sharp sheet separating point 117 located adjacent the point 112 of the member 109. The end of the sleeve 113 opposite that provided with the segmental enlargement 115 is provided with a circular enlargement 118 projecting beyond the end 108 of the member 109 and provided with a notch 119 that receives the free end 120 of the cam lever 105.

The element 109 constitutes a main sheet separating or lifting element and the member 113 constitutes an auxiliary sheet separating element. Through rotation of said elements by the shaft 92 and the cam lever 105 connecting them, the stationary box cam 100 rotates member 113 relative to member 109 so as to enter point 117 in the pile of sheets 25 prior to entry of the point 112 therein and so as to retract point 117 relative to point 112 after entry thereof into the pile so that the lifting and separating action is completed solely by the point 112.

This operation will be more clearly understood by reference to Figs. 11 to 15 inclusive of the drawings wherein it will be noted that as shown in Fig. 11 points 112 and 117 have just passed out of the corner of the supply of sheets 25 and point 117 is advancing relative to point 112. During rotation of the parts from the position shown in Fig. 11 to that shown in Fig. 12 point 117 is fully advanced and, as shown in Fig. 13, point 117 enters the corner of the pile of sheets in advance of point 112 to facilitate the entry of the latter into the pile. As shown in Fig. 14, point 112 has entered the corner of the pile of sheets and point 117 has retracted at which time point 112 begins to lift the sheets so that they pass through slot 114 of sleeve 113 into the pocket 110 of the member 109. Through continued rotation of the parts, the sheets are raised solely by the point 112 out of the pocket 110, as shown in Fig. 15, and on to the segmental truncated end 111 of the member 109, as shown in Figs. 20 to 24 inclusive of the drawings. Portions or corners of the sheet supply are thus continuously lifted and maintained in position on the segmental truncated ends 111 of members 109 for the action of combing devices which are indicated broadly at 121. As herein shown there are two combing devices 121 which are located adjacent upper rear corners of the pile of sheets and act to comb their side edges outwardly. Since the constructions of the two combing devices are identical, a description of one will suffice for both.

Each combing device 121 is preferably mounted, constructed and operated as follows. Fixed on the shaft 79 of each separator unit 43 within the housing thereof is a cam 122 (Fig. 6) which bears against a roller 123 journalled on one arm 124 of a bell crank 125 having another arm 126 projecting forwardly of the separator housing through a suitable opening in the cover plate 60 thereof. The bell crank 125 is journalled on the shaft 81 and the spur gear 80, fixed on said shaft, has compounded therewith a bevel gear 127 which meshes with a similar gear 128 that is fixed on a short shaft 129. This short shaft 129 is journalled in a suitable bearing on the bell crank arm 126 and projects forwardly thereof beyond said arm and the separator housing to a point above the adjacent corner lifting or separating device comprised by the elements 109 and 113. Fixed on the projecting end of each short shaft 129 is a combing wheel 130. The combing wheels 130 are rotated in the direction of the arrows indicated in Fig. 24 through the described driving connections for said wheels with the shafts 79 that are driven, as above described, from the power transmission units 44.

Each bell crank arm 126 has pivotally connected therewith at 131 a vertically disposed spring pressed rod 132. The upper end of the rod 132 is guided in an eye bolt 133 (Figs. 5 and 7) secured for vertical adjustment in any suitable manner on the guide 69. The spring for rod 132 is indicated at 134 and mounted thereon between the eye bolt 133 and the pivotal connection for the rod with bell crank arm 126. The spring pressed rods 132 impart downward movement to the bell crank arms 126 and the combing wheels 103 and upward movement is imparted thereto by the cams 122 through their engagement with the rollers 123 on the bell crank arms 124. The combing wheels 130 are thus spring operated in one direction and cam operated in the opposite direction and the pressure of springs 134 may be adjusted by vertically adjusting the eye bolts 133. Once during each cycle of operation of the feeder, and at the proper time, the combing wheels 130 are lowered on to the sheets that rest on the segmental truncated end portions 111 of the members 109 and effect a preliminary separation of the top sheet through outward pulling action on opposite side edges thereof. After preliminary separation of the top sheet has been effectd by the combing wheels 130 they are raised and the sheet is then gripped and separated by suction sheet separating devices two of which are herein shown and located adjacent upper rear corner portions of the pile of sheets 25. Since the constructions of the two suction sheet separating devices are identical a description of one will suffice for both.

Each suction sheet separating device is preferably mounted, constructed and operated as follows. Each shaft 79 has fixed on the outwardly projecting end thereof a cam 135 (Figs. 7 and 9) which engages a roller 136 journalled on one arm 137 of a bell crank lever 138 which is pivoted at 139 on the side plate 58 and is provided with another arm 140 curved forwardly and downwardly at its front end. Pivotally connected as at 141 on the curved lower forward end of the bell crank arm 140 is the lower end of a link 142. The upper end of link 142 is pivotally connected as at 143 with one end of a link 144 the opposite end of which is pivotally connected as at 145 with a latch carrying arm 146. This latch carrying arm 146 is pivotally mounted as at 147 on a bracket 148 that is secured in any suitable manner to, or formed integrally with, the slide 69 and projects forwardly therefrom. Pivotally connected as at 149 with the arm 140 of bell crank 138 is the lower end of a vertical spring pressed rod 150. The upper end of rod 150 is guided in an eye-bolt 151 secured for vertical adjustment in any suitable manner on the slide 69. The spring 152 for the rod 150 is mounted thereon between the pivotal connection 149 and the eye-bolt 151.

The suction sheet separating devices proper are indicated broadly at 153 and said devices are constructed and operated in the same manner as the suction sheet separating devices shown in the United States Patent No. 1,475,621 above referred to. It is therefore unnecessary to describe the suction sheet separating devices in detail although it may be pointed out that each of the same comprises a rubber suction sheet engaging cup 154 secured to and in communication with an arcuate shaped member 155 having telescoping action and communication with a hollow arcuate shaped housing 156. The housing 156 is provided thereon with a pile engaging foot 157 and is secured on and communicates with the lower end of a pipe 158 that is clamped at 159 on an extension 160 of the link 142.

It will thus appear that the bell crank arms 140 are raised by the cams 135 and are lowered by the spring pressed rods 150, thus raising and lowering the suction sheet separating devices 153 at intervals such that following combing of the top sheet, the feet 157 engage the pile of sheets 25 and the cups 154 engage the combed sheet and bend it up about the feet 157 through vacuum retraction of members 155 into housings 156. Thereupon the devices 153 are lifted to further separate the sheet. When the devices 153 have separated and lifted a sheet it is acted upon by sheet forwarding devices hereinafter described at which time the devices 153 are released from the sheet. The members 155 are thereupon moved outwardly and downwardly relative to housings 156 by springs (not shown).

It frequently happens that after the feeder has been started it is necessary or desirable to adjust the angular position of the suction sheet separators for more effective and accurate separation. This is particularly true when the sheets at the top of the pile are curled or wavy, and in accordance with the present invention such angular adjustment of the suction sheet separators may be made while the feeder is in operation, thus avoiding loss of time and production. These adjustments are made by swinging the latch carrying arms 146 (Figs. 1, 5, 6, 7 and 9) about their pivots 147 and locking said arms when the devices 153 and their sheet engaging cups 154 have been adjusted to the proper or desired angular positions with respect to the top of the pile of sheets 25. Each device 153 may be adjusted independently of the other and, accordingly, each arm 146 has pivoted thereon at 161 (Fig. 7) a latch 162 extending transversely under the bracket 148. The free end of the latch 162 has connected therewith the lower end of a spring 163 (Fig. 5) the upper end of which is secured to the pivot 147 of arm 146.

Secured to or formed integrally with the bracket 148 on the under side thereof is a rack 164 having teeth 165 between any two of which a tooth 166 of the latch 162 may be engaged selectively through depression of the latch by its handle 167 and swinging movement of the same and the arm 146 about the pivot 147. Such swinging movement of arm 146 imparts corresponding movement to the links 144 and 142 thereby swinging the separator 153 about the pivot 141 to the desired angular position. The separator is then locked in said position through release of the handle 167 and action of the spring 163 which causes the tooth 166 on latch 162 to engage the adjacent teeth 165 of rack 164. Excess movement of the arm 146 in one direction is prevented by a pin 168 on bracket 148 and excess movement of the arm 146 in the opposite direction is prevented by the bottom of the slide 69. Various positions of adjustment of the arm 146 and the separator 153 are indicated in full and dotted lines in Fig. 9 of the drawings.

During operation of the combing wheels 130 to comb the sheets outwardly, the top of the pile is winded from the rear thereof by pile winding devices 169 (Figs. 1, 2, 7 and 8) through which air blasts are directed. The air blasts are cut off just prior to or about the time each sheet is gripped by the separating cups 154 and said winding devices 169 extend forwardly of and are secured to or formed integrally with vertical pipes 170. The pipes 170 are secured for vertical adjustment in clamps 171 which, in turn, are secured by bolts 172 on T-shaped brackets 173. These brackets 173 are secured, as by bolts 174, to plates 58 and are spaced therefrom by spacer elements 175 located on said bolts between said plates and the brackets.

After each sheet is separated by the cups 154 and while it is being advanced by the sheet forwarding devices hereinafter described, the sheet is winded from below by sheet winding devices which also act as foot clamps or hold downs and are preferably operated and mounted as follows. Located outwardly of the cams 135 and fixed on the outwardly projecting ends of shafts 79 are cams 176 (Figs. 1, 7 and 8) which engage rollers 177 journalled on arms 178 that are pivoted at 179 on the plates 58. These arms 178 have pivoted thereto at 180 corresponding ends of spring pressed rods 181 the opposite ends of which are guided in suitable openings formed in studs 182 secured in any suitable manner to the lower ends of the brackets 173. The springs 183 for the rods 181 are mounted thereon between the studs 182 and collars 184 secured in any suitable manner on said rods. It will thus appear that the arms 178 are cam operated in one direction and spring operated in the opposite direction about their pivots 179 on the plates 58.

The arms 178 have pivoted thereto at 185 cam links 186 through the cam grooves 187 of which extend reduced rounded portions of the spacer elements 175 for the forward bolts 174 that secure the brackets 173 to the plates 58. Bolted or otherwise suitably secured as at 188 to the cam links 186 are clamps 189 in which are secured for vertical adjustment, as by clamp screws 190, pipes 191 the lower ends of which have secured thereto or formed integrally therewith forwardly extending combined blow pipes and foot clamps 192.

Through rocking movement of arms 178 and the action of the cam grooves 187 in cam links 186 the latter are moved downwardly, inwardly, outwardly and upwardly once during each cycle of operation of the machine. This results in corresponding movements of the combined blow pipes and foot clamps 192, their downward and inward movement occurring after each sheet is separated and resulting in a clamping action of the blow pipes and foot clamps on the top of the pile to prevent displacement of any underlying sheet while the separated sheet is being winded and forwarded. When the blow pipes and foot clamps are clamped upon the top of the pile below the separated sheet, the latter has been gripped by the forwarding devices and blasts of air are then directed under the sheet while it is being forwarded to instrumentalities hereinafter described. The blasts of air through the foot clamps and blow pipes 192 are then cut off whereupon they move outwardly and upwardly for repetition of the cycle and operation on the next sheet in proper timed relation with the operation of the sheet separating and forwarding devices.

When each sheet is separated and lifted by the separating devices 153, and while blasts of air are being directed through blow pipes and foot clamps 192 under the sheet, said sheet is gripped by sheet forwarding devices indicated broadly at 193 at which time the sheet separating devices 153 are released from the sheet for action thereof on the next sheet. The sheet forwarding devices 193, in accordance with the embodiment of the invention herein shown, feed each separated sheet forwardly under and in lapped relation with a preceding separated and forwarded sheet to provide a stream of lapped sheets moving continuously from the pile to sheet feeding and conveying means hereinafter described that feed the stream of lapped sheets continuously to a printing press or other machine with which the feeder is associated.

The sheet forwarding devices 193 (Figs. 1 to 4, inclusive) are preferably of the type disclosed in the application of Leonard Baker, George A. Martin and Leo C. Williams, Serial No. 116,692, filed December 19, 1936, and said devices are preferably mounted and operated as follows. Mounted on and slidable along one of the side members 10 and the driven shaft 34 is a bracket 194 between the arms 195 of which is located a barrel cam 196 that is keyed to and slidable along said shaft with said bracket. The cam groove 197 of cam 196 has extending therein a roller 198 that is journalled on an arm 199 fixed on one closed end of a tubular rock shaft 200 journalled in the bracket 194 at the under side thereof. The opposite closed end of the tubular rock shaft 200 is journalled in a bracket 201 mounted on and slidable along the side member 10 opposite that which carries the bracket 194. The tubular rock shaft 200 is also journalled in a bracket 202 mounted on and slidable along a bar 203 located above said rock shaft and extending longitudinally of the feeder centrally and at the top thereof. One end of the bar 203 is secured on a bracket 204 mounted on the stay shaft 12 and the opposite end of said bar is secured in any suitable manner on the feeder frame at the top and front thereof.

Extending transversely of the feeder and secured in any suitable manner in the brackets 194 and 201 is a cross shaft 205 on which are slidably and rotatably mounted the forked upper ends of arms 206. Keyed to and slidable along the rock shaft 200 are the forked upper ends of arms 207. The shafts 200 and 205 have loosely mounted thereon between the forked upper ends of the arms 206 and 207 links 208 whereby said arms and all parts carried thereby including the forwarding devices 193 may be adjusted transversely of the feeder to any desired position and there secured, as by set screws 209, for operation by the cam 196 and the rock shaft 200.

In accordance with the present invention the sheet forwarding devices 193 have reciprocating motion imparted thereto by the rock shaft 200 and parallelogram systems of arms 206, 207 and horizontal links 210. The horizontal links 210 are pivotally connected at 211 and 212 with the lower ends of arms 206 and 207 and project rearwardly of the latter. The links 210 are provided on their rearwardly projecting ends with bosses 213 in which are slidably mounted for vertical adjustment, the vertically disposed cylinders 214 of the sheet forwarding devices 193. These cylinders 214 communicate with and have secured to the lower ends thereof hollow bosses 215 which also communicate with and have secured thereto the lower ends of vertical tubes 216. The tubes 216 have upper threaded ends which extend through suitable openings in the bosses 213 and carry thereabove adjusting nuts 217 and lock nuts 218 which support the sheet forwarding devices 193 on the rearwardly projecting ends of links 210 and enable said devices to be vertically adjusted in said bosses.

The sheet forwarding devices 193, as in the case of the similar devices shown in application Serial No. 116,692 above referred to are provided in the cylinders 214 thereof with hollow piston stems 219 which project downwardly through suitable openings in the bottom of said cylinders and carry rubber sheet engaging and forwarding cups 220 communicating with said stems and said cylinders. The stems 219 and cups 220 are actuated downwardly by vacuum to engage the sheets and are actuated upwardly by vacuum and preferably with the aid of springs (not shown) when said cups have gripped a sheet.

The sheet forwarding devices 193 and the operating means therefor are, as clearly shown in the drawings, located at the top and rear of the feeder and grip each separated and winded sheet at the rear thereof. The forwarder operating means are accordingly so timed with relation to the other mechanisms of the feeder that the forwarding devices 193 are moved rearwardly by the barrel cam 196 and rock shaft 200 to engage the separated and winded sheet whereupon the latter, being released by the separator cups 154, is then forwarded by forward motion of the forwarding devices 193 imparted thereto by said barrel cam and said rock shaft. The forwarded sheet is delivered under and in lapped relation with a preceding sheet to the sheet feeding and conveying means hereinafter described, whereupon the cups 220 are released from the sheet and returned rearwardly by the described forwarder operating means for action upon the next separated and winded sheet.

Suitable means (Fig. 3) are provided for supplying air under pressure at predetermined intervals through the blow pipes 169 and foot clamps 192, and for creating and breaking vacuum at predetermined intervals in the sheet separating devices 153 and the sheet forwarding devices 193 and as herein shown said means are preferably mounted on and comprised by the following instrumentalities. Located at each side of the feeder near the front and bottom thereof and secured in any suitable manner to the front uprights 5 is a bracket 221. Each bracket 221 has bolted or otherwise suitably secured thereto corresponding ends of cross beams 222 which have mounted thereon and secured thereto in any suitable manner a heavy metal plate 223 providing a drip pan for devices carried thereby including an electric motor 224. This motor 224 is connected with any suitable source of current and controlled for starting and stopping purposes by any suitable switch means (not shown).

The motor 224 is bolted or otherwise suitably secured on the plate 222 and fixed on the projecting end of its armature shaft 225 is a sprocket 226. Passing around sprocket 226 and driven thereby is a chain 227 which also passes around a sprocket 228 on the projecting end of the shaft 229 of a combined air and vacuum pump 230 of well known construction and needing no detailed description herein. The pump 230 is driven by motor 224 and bolted or otherwise suitably secured on the plate 223. The air side 231 and vacuum side 232 of pump 230 are connected by the usual conduit 233. The air side 231 of the pump 230 has connected therewith one end of a conduit 234 the opposite end of which is connected with a tank 235 for storage of compressed air produced by said pump. The tank 235 is mounted on, and secured in any suitable manner to, the under side of the plate 223 and connected with said tank is one end of a conduit 236. The opposite end of conduit 236 is connected with the lower extremity of a vertical conduit 237 extending upwardly at one side of the feeder and having its upper extremity connected with a short conduit 238 formed in one of the front heads 7. This same head 7 has formed therein a rearwardly extending horizontal conduit 239 communicating with the conduit 238 and connected with a rigid tubular conduit 240 secured to said head and extending rearwardly therefrom between the adjacent side members 9 and 10. Connected to and having telescopic relation with the conduit 240 is a conduit 241 that is connected with a conduit 242 which, in turn, is connected with the upper part of the hollow housing 243 of the rotary valve mechanism 42. This rotary valve mechanism 42 controls delivery of air under pressure to the pile and sheet winding devices connected therewith, whereas the rotary valve mechanism 41 controls the making and breaking of vacuum in the suction sheet separating and forwarding devices connected therewith. The rotary valve mechanisms 41 and 42 are mounted on the hollow cross bar 36 as previously described.

The rotary valve mechanism 42 and the rotary valve mechanism 41 are of substantially the same construction and operation as the rotary valve mechanism disclosed in the application Serial No. 116,692 above referred to except that in the present case the vacuum controlling valves are separate from the air controlling valves and the two are comprised by the separate units 41 and 42, respectively. The conduit 242, as previously described, is connected with the upper part of the hollow housing 243 of valve mechanism 42, and located at one side of said housing is a rotary valve 244. Valve 244 controls the delivery of air under pressure at predetermined intervals from the upper part of housing 243 to a conduit 245 connected with the lower part of said housing (Fig. 2). The conduit 245 is supported in proper position by the housing 243 and by a similar part of the valve mechanism 41 in which it is mounted in any suitable manner.

The valve 244 is connected with and rotated by a driving disk 246 which is secured to and rotated by the shaft 40 extending through valve mechanism 42 and bracket 35 and driven by the described driving connections for said shaft with the driven shaft 34. The conduit 245 has connected thereto and communicating therewith corresponding ends of flexible conduits 247 the opposite ends of which are connected to and communicate with the pipes 170 of the pile winding devices or nozzles 169. It will thus appear that by means of the housing 243, valve 244, and the described connections for said valve with the air side 231 of pump 230 and the pile winding devices or nozzles 169, air under pressure will be delivered at predetermined intervals through said devices or nozzles in order to wind upper rear portions of the pile of sheets 25 during operation of the combing wheels 130 thereon.

The air under pressure delivered to the foot clamps and blow pipes 192 to wind each sheet separated by the separating devices 153 is conducted and controlled in the following manner. The housing 243 has a hollow part 248 thereof communicating with the hollow cross bar 36. Air under pressure is delivered periodically from the housing through the part 248 thereof into the cross bar 36, the delivery of the compressed air therein being controlled by a rotary valve 249 mounted on the shaft 40 at one side of the housing 243 and in cooperative relation with said housing and the part 248 thereof. The valve 249 is connected with and rotated by a driving disk 250 which, in turn, is fixed on and rotated by the shaft 40. The hollow cross bar 36 has connected thereto and communicating therewith corresponding ends of flexible conduits 251 the opposite ends of which are connected to and communicate with the pipes 191 of the hollow foot clamps and blow pipes 192.

It will thus appear that by the valve 249, the housing 243, the housing part 248, and the described connections therefor with the air side 231 of pump 230 and the blow pipes and foot clamps 192, blasts of air will be delivered under each sheet separated by the devices 153 and gripped by the devices 193. It will further appear that said air may be shut off by valve 249 at or about the time the sheet has been completely forwarded by the devices 193 so that said air can assist said devices in forwarding the sheet.

Vacuum is created and broken in the sheet separating devices 153 at predetermined intervals so that they function to grip and release the sheets successively as hereinbefore described. For this purpose, the vacuum side 232 of the pump 230 has connected therewith one end of a conduit 252 the opposite end of which is connected with the lower extremity of a vertical conduit 253 disposed at the side of the feeder opposite that where the conduit 237 is located. The upper extremity of the conduit 253 is connected with a short conduit 254 formed laterally in the adjacent head 7 and leading outwardly therethrough. This conduit 254 is connected with a horizontal conduit 255 formed in the last mentioned head 7 and extending outwardly through the rear thereof. Connected with the conduit 255 in any suitable manner is a rigid conduit 256 disposed between the adjacent side members 9 and 10 and having connected thereto in telescoping relation therewith a conduit 257 that is also located between said side members. The conduit 257 is connected at the rear thereof with a conduit 258 extending transversely of the feeder and connected with upper part of the hollow housing 259 of the valve mechanism 41.

Mounted on the driven shaft 40 at one side of the housing 259 is a rotary valve 260 for establishing communication at intervals between the upper part of said housing and a chamber formed in an extension 261 thereof. The rotary valve 260 is connected with and rotated by a driving disk 262 that is fixed on the shaft 40 and rotated thereby. The shaft 40 extends through the rotary valve mechanism 41 and has a bearing in the housing 259 thereof. Connected with said chamber of the extension 261 of housing 259 are the corresponding ends of flexible conduits 263 the opposite ends of which are connected with the pipes 158 of the suction sheet separating devices 153.

It will thus appear that by the valve 260, the housing 259, the chambered extension 261, and the described connections therefor between the vacuum side 232 of pump 230 and the pipes 158 of sheet separating devices 153, vacuum will be created and broken in said sheet separating devices so that they grip each sheet to separate and lift it and release the lifted sheet to return toward the pile and act on the next sheet when the preceding separated and lifted sheet has been engaged by the sheet forwarding devices 193 and is moved forwardly thereby.

Vacuum is created and broken in the sheet forwarding devices 193 at predetermined intervals so that they grip the separated sheets successively, release each sheet when it is forwarded, and engage the next sheet to forward it in lapped relation with the preceding sheet. For this purpose there is mounted on the driven shaft 40 at the side of the hollow housing 259 opposite that engaged by the valve 260, a rotary valve 264 connected with and driven by a driving disk 265 that is fixed on and rotated by the shaft 40. The valve 264 controls communication between the source of vacuum in housing 259 and a separate lower hollow part thereof having connected therewith one end of a flexible conduit 266. The opposite end of the conduit 266 is connected with an annular passage 267 formed in the bracket 202 and communicating with the interior of the hollow rock shaft 200 through a port 268 formed therein. The hollow rock shaft 200, as previously described, extends through and is journalled in the bracket 202, and connected with the interior of said hollow rock shaft at opposite sides of said bracket are corresponding ends of flexible conduits 269. The opposite ends of conduits 269 are, in turn, connected with the pipes 216 that are connected to and in communication with the cylinders 214 of the sheet forwarding devices 193.

It will thus appear that by the rotary valve 264, the hollow housing 259 and its hollow lower part, and the described connections therefor with the vacuum side 232 of pump 230 and the cylinders 214 of the sheet forwarding devices 193, vacuum will be automatically created and broken in said sheet forwarding devices at predetermined intervals such that each separated sheet may be gripped by the cups 220 at the rearmost positions thereof, forwarded successively under and in lapped relation with a preceding forwarded sheet, and released for rearward travel of said cups and their gripping and forwarding action on the next sheet. Each sheet gripped, forwarded, and released by the devices 193 is delivered under and in lapped relation with a preceding sheet to sheet feeding and conveying means that conveys a stream of the lapped sheets to the printing press or other machine with which the feeder is associated. This sheet feeding and conveying means is preferably constructed and operated as follows.

Extending transversely of the feeder near the top and front of the pile of sheets 25 is an upwardly and forwardly curved plate 270 (Figs. 1 and 2) over which the sheets pass during movement imparted thereto by the sheet forwarding devices 193. This plate 270 is provided in its upper front edge with notches 271 in which the jogger fingers 27 are operated. The plate 270 has each end thereof secured in any suitable manner, to a bracket 272 which, in turn, is secured in any suitable manner to the adjacent front head 7 of the feeder frame near the top thereof.

Extending transversely of the feeder adjacent the forward upper edge of the curved plate 270 is a feed roller 273 that is journalled in any suitable manner in brackets 272 and the front heads 7. This feed roller 273 is rotated continuously and at slow speed by any suitable source of power connected therewith. Located above the feed roller 273 are pressure rollers 274 which cooperate with said feed roller to receive the forwarded sheets in lapped relation as before described and feed a stream of the lapped sheets forwardly. The pressure rollers 274 are journalled on arms 275 adjustably secured on a cross shaft 276 having its opposite ends mounted in any suitable manner in the front heads 7. The stream of lapped sheets is fed by the rollers 273 and 274 over a plate 277 which extends transversely of the feeder forwardly of said rollers and has its opposite ends secured in any suitable manner on the brackets 272.

The stream of lapped sheets fed over the plate 277 is delivered thereby on to a continuously driven, slow moving conveyor including driven tapes 278 that advance the stream of lapped sheets continuously to the printing or other machine which takes the front upper sheets successively from the stream and acts upon them in like manner to print or otherwise treat and deliver them. The front ends of the tapes pass around a suitable roller or rollers (not shown) adjacent the printing or other machine, and the rear ends of said tapes pass around and are driven by roller 279 having the same surface speed of rotation as that of roller 273 and driven from any suitable source of power. Roller 279 is journalled in suitable bearings in brackets 272 and the tapes 278 which pass around and are driven by said roller also pass around an idler roller 280 and tightening rollers 281. The idler roller 280 extends transversely of the feeder and is journalled in any suitable manner on the front heads 7. The tightening rollers 281 are journalled on arms 282 adjustably fixed on a cross shaft 283 so as to provide the proper or desired tension on the slow moving conveyor tapes 278. The cross shaft 283 has its opposite ends secured in any suitable manner in the front heads 7, and located above the idler roller 280 is a second idler roller 284 over which the tapes 278 also pass. This idler roller 284 supports the upper reaches of the tapes 278 and has its opposite ends journalled in any suitable manner on pins 285 secured to and projecting inwardly from the front heads 7.

The operation of the feeder will be clearly understood from the foregoing description and may be briefly summarized as follows. The pile of sheets 25 on the elevator is intermittently raised step by step to maintain the top of the pile at a predetermined level as sheets are separated and forwarded therefrom in succession by the described devices for this purpose.

The elements 109, 113 for separating portions of the supply from the remainder thereof are rotated continuously and operated as described so that the rounded or unsharpened points 112 and the sharpened points 117 repeatedly enter the supply and continuously maintain portions of the supply separated from the remainder thereof. When the elevator is stationary the separating elements 109, 113 rotate idly into and out of the supply but at each step of elevation of the supply imparted thereto by the elevator, the elements 109, 113 pick up or separate additional sheets so that there is always continuously maintained, by said elements, separated portions of the supply resting on the truncated conical ends 111 of the elements 109.

The sharpened points 117 of elements 113 are, through the described means for this purpose, advanced relative to the rounded unsharpened points 112 of the elements 109 exteriorly of the supply or pile and enter the same prior to said points 112 to initiate the separating action. After entry of the sharpened points 117 into the pile they are retracted relative to the rounded or unsharpened points 112 by the described means for this purpose and separation of the portions of the supply from the remainder thereof is effected solely by the rounded or unsharpened points 112.

During operation of the pile corner separating elements 109, 113 the sheets first engaged thereby move into the pockets 110 through the openings 114 but are thereafter lifted by the points 112 and rest on segmental truncated conical inner ends 111 of the elements 109. During idle operation of the elements 109, 113, that is when the supply is stationary and said elements are not separating sheets therefrom and adding them to the portions of the supply resting on the conical ends of elements 109, points 112 and 117 are advanced and retracted relatively so that only the rounded or unsharpened points 112 contact the sheets and scratching or marring of the same is thereby prevented during repeated rotation of the elements 109 and 113.

The sheets resting on said conical ends of elements 109, as shown in Fig. 2, have their outer edges combed outwardly in succession by the combing wheels 130, and during each operation of said combing wheels the upper rear portions of the pile of sheets 25 are winded by air blasts directed through the winding devices 169. The air blasts through devices 169 are intermittent, occurring just prior to and during operation of the combing wheels and being cut off upon completion of the combing operation, all by the described air supply and valve control means for this purpose.

Figure 21:
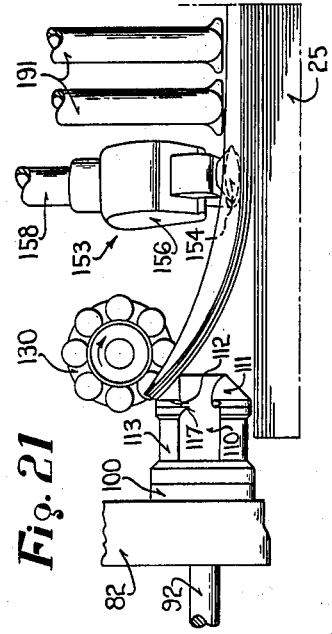
Figure 23:
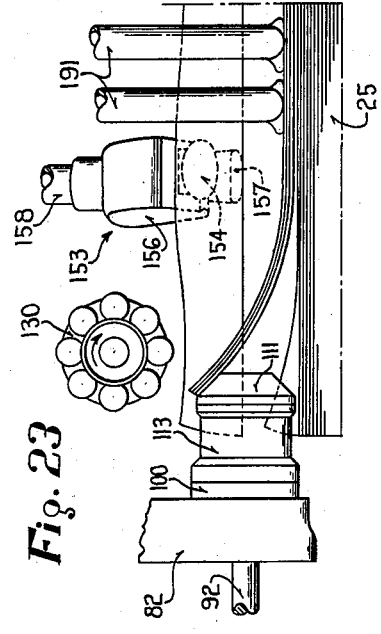
Figure 20:
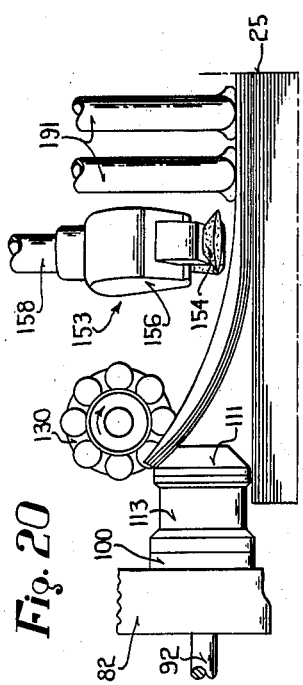

As shown in Figs. 2 and 20 the combing wheels 130 are combing the outer edges of the top sheet, and at the beginning of the combing operation the blow pipes and foot clamps 192 are resting on the top of the pile. During continued combing of the sheet, as shown in Fig. 21, the blow pipes and foot clamps 192 have the air blasts cut off therefrom and are raised off the pile and moved rearwardly thereof by the described means for this purpose. In the meantime, and as shown in Figs. 2 and 21, the sheet separating devices 153 have been lowered to engage their feet 157 with the top of the pile, the parts 155 having been telescoped outwardly and downwardly with relation to the parts 156 so that the cups 154 are in position to grip the topmost combed sheet.

Figure 22:
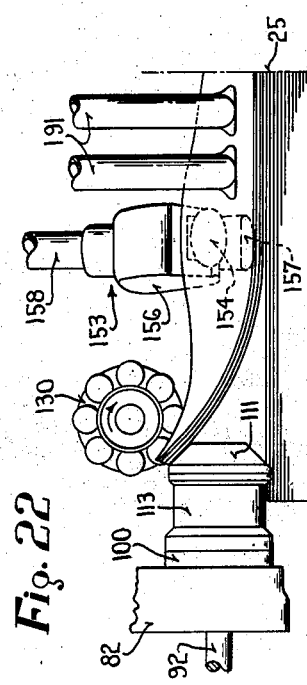

Combing of the top sheet continues, as shown in Figs. 22 and 24, and as therein illustrated the sheet separating cups 154 grip the combed sheet at which time the blow pipes and foot clamps 192 are still disposed upwardly and outwardly of the rear and top of the pile. When the combed sheet is gripped by the cups 154 the parts 155 telescope upwardly and forwardly into the parts 156, thus bending up corner portions of the combed sheet about pile engaging feet 157 and lifting the intermediate portion of said sheet. At this time comber wheels 130 and the sheet separating devices 153 in their entirety are raised in succession by the described means for this purpose, and assume the positions thereof shown in Fig. 23 wherein it will be noted that the entire rear edge of the combed sheet has been completely separated and lifted relative to the sheet below. While the lifted rear edge of the sheet is gripped by the cups 154 the blow pipes and foot clamps 192 are lowered and moved inwardly under said sheet on to the top of the pile whereupon blasts of air, controlled as before described, and directed through said blow pipes and foot clamps forwardly thereof wind the lifted sheet and complete the separation thereof.

At this time the sheet forwarding devices 193 have moved to their rearmost positions and grip rear portions of the lifted separated sheet which is then released from the cups 154 by breaking of vacuum therein through the described means for this purpose. The devices 193 now move forward carrying the separated sheet in the same direction therewith and air blasts from the foot clamps and blow pipes 192 are continued under the forwardly moving sheet to assist its forward movement until the front edge of the sheet is delivered by the devices 193 between the rollers 273 and 274 under and in lapped relation with a preceding forwarded sheet or sheets engaged between and being fed by said rollers. The cups 220 of the forwarding devices 193 are then released from the forwarded sheet by cutting off vacuum in said cups through the described means for this purpose, whereupon the forwarding devices 193 again move rearwardly to engage the next sheet which in the meantime has been combed, separated and lifted by the described means for this purpose.

The above operations of the elevator, the rotary sheet separating elements 109, 113, the pile winding devices 169, the combing wheels 130, the suction sheet separating devices 153, the blow pipes and foot clamps 192, and the suction sheet forwarding devices 193 are repeated in the order described so that there is continuously supplied to the rollers 273 and 274 a stream of lapped sheets which, in turn, is moved slowly and continuously by the tapes 278 to the printing press or machine that takes the forward uppermost sheets successively from the stream for performance of the printing or other operation thereon and delivery of the sheets in succession therefrom.

Vertical adjustment of the sheet separating units 43 in their entireties may be made as desired by rotation of the handles 73. Adjustment of one sheet separating unit may be made independently of the other and, morever, such adjustment of the sheet separating units may be made while the feeder is in operation and without disturbing the driving connections for the movable parts of the said units with the power transmission units 44. Further, the power transmission units 44, as well as many of the operating parts of the sheet separating units are enclosed in housings, thus meeting the requirements for protection of operators while, at the same time, preventing unnecessary wear on movable parts by exclusion of dust and dirt therefrom.

Further, through the provision of the power transmission units 44 and the slidable driving connections therefor with the sheet separating units, a simple and common source of power therefor, such as the driven shaft 34, may be arranged at one side of the feeder thus eliminating telescoping and other forms of driving connections heretofore required which have extended over the pile, obstructed observation of the operation of the sheet separating and forwarding devices and the making of repairs thereto, and have often spoiled sheets of the pile by dripping of oil thereon.

The sheet separating units 43 are not only adjustable vertically with respect to the pile but, with the power transmitting units 44, are adjustable transversely of the feeder together or independently. These last mentioned adjustments may be made by moving said sheet separating and power transmission units manually along the hollow cross bar 36 and clamping the upper housing members 45 to said bar, as by thumb screws 286. Transverse adjustment of the sheet separating units and the power transmission units may be made without disturbing the driving connections therebetween or the driving connections between said power transmission units and the shaft 34.

While the feeder is in operation, angular adjustment of the suction sheet separating devices 153 may be made, as previously described, by the adjusting handles 167. The angular adjustment of each suction sheet separating device 153 may be made independently of the other suction sheet separating device.

The power transmission units 44, the sheet separating units 43 and the sheet forwarding devices 193 may be adjusted as a unit forwardly and rearwardly of the machine in accordance with the length of the sheets being handled in the feeder. For this purpose, the brackets 35 and 37 have secured thereto in any suitable manner corresponding ends of threaded rods 287 (Figs. 1, 3 and 4). The opposite ends of rods 287 pass through suitable openings in brackets 194 and 201 and are retained against displacement therefrom by locking and adjusting nuts 288 threaded on said rods at opposite sides of portions of said brackets disposed between said nuts. Disposed below the driving shaft 40 and journalled in suitable bearings in the brackets 35 and 37 which carry said shaft, is a shaft 289 (Figs. 1 and 2) having fixed thereto at the inner side of the bracket 35 a hand wheel 290. Fixed on the shaft 289 at the outer sides of brackets 35 and 37 are spur pinions 291 which mesh with spur gears 292 that are fixed on short shafts 293 journalled in any suitable manner on said brackets. The short shafts 293 also have fixed thereon spur pinions 294 the teeth of which mesh with the teeth of racks 295 secured to or formed on the bottom portions of the side members 10 (Fig. 1).

It will thus appear that through the rod connections 287 between brackets 35, 37 and brackets 194, 201, and through the described driving connections for shaft 289 with the spur pinions 294, the latter may be rotated by the hand wheel 290 in either direction to move said brackets in the corresponding direction along the side members 10 and the driving shaft 34, through engagement of the teeth of the spur pinions 294 with the teeth of the racks 295 on said side members.

Forward or rearward movement of the brackets 35, 37 and 194, 201 on the side members 10 results in corresponding movement of the sheet separating units 43 and their power transmission units 44, the sheet forwarding devices 193, and the described driving and operating parts thereof. Forward and rearward movements of said units and devices along side members 10 are accomplished without disturbing the driving connections therefor with the shaft 34 since it will appear that during such movements the bevel gear 38 and the barrel cam 196 which are keyed on the shaft 34 slide therealong with the brackets 35 and 194. Further, forward and rearward adjustment of the sheet separating units 43 and the sheet forwarding devices 193 is effected without disturbing their pneumatic connections with the pump 230 for, as previously described, the conduits 241 and 257 are disposed in telescoping relation with the stationary conduits 240 and 256 and merely slide in and out of the latter in accordance with the direction of the adjustment of said units and devices.

The sheet forwarding devices 193 may be adjusted relative to as well as a unit with the sheet separating units 43 as, for example by loosening the locking and adjusting nuts 288, sliding the brackets 194 and 201 along rods 287 with corresponding movement of the barrel cam 196 and bracket 194 along shaft 34, and thereupon tightening said locking and adjusting nuts.

The sheet feeder of the present invention is capable of feeding a wide variety of sheets of various materials, dimensions and thicknesses and in some instances, particularly in connection with the feeding of relatively thick sheets of cardboard or similar material, the use of the rotary sheet separating elements 109, 113 and the combing wheels 130 is not desirable or necessary. Said elements and wheels may therefore be raised above the pile out of operation and held thereabove in inoperative positions. For this purpose, the plates 82 have threaded in the upper sides thereof set screws 296 (Fig. 5) located directly under extended pivots 297 connecting the lower ends of spring pressed rods 132 with the bell crank arms 126 that carry comber wheels 130. By swinging the elements 109, 113, the housings comprised by plates 82 and covers 96, and the driving parts in said housings upwardly about the shafts 81, corresponding upward movement is imparted to combing wheels 130 through engagement of said screws 296 with the extended pivots 297. Under these conditions the springs 134 are compressed and the rotary sheet separating elements 109, 113 and the combing wheels 130 are held in raised inoperative positions by latches 298 which are pivoted on the stops 83 of plates 82 and engaged with the under, flat sides 84 of the pins 85 upon upward movement of said rotary elements and wheels to their inoperative positions aforesaid.

When the rotary sheet separating elements 109, 113 and the combing wheels 130 are raised to and held in their inoperative positions as above described, they continue to rotate, and to prevent interference between wheels 130 and the truncated ends 111 of elements 109, the screws 296 are adjusted to keep the wheels out of contact with said conical ends of elements 109. Further, in the operative positions of the rotary sheet separating elements and combing wheels, to which they are returned upon releasing latches 298 from pins 85, screws 296 prevent springs 134 from forcing wheels 130 into engagement with the conical ends 111 of elements 109 as, for example, when the feeder is first started and no sheets have been separated and raised into position on the conical ends of said elements 109.

The present invention has been herein described and illustrated with more or less particularity in connection with the embodiment shown and comprising a stream feeder. It is to be expressly understood, however, that the present invention is not limited to the particular embodiment thereof herein illustrated and described or otherwise than by the terms of the appended claims.

What I claim is:

1. In a sheet feeder, means for maintaining opposite corner portions of a sheet supply spaced therefrom for action of sheet combing means thereon and comprising two laterally spaced sets of main and auxiliary devices for separating sheets from the supply and adding them to said opposite corner portions to replace sheets separated and forwarded in succession relative to said supply, means for repeatedly moving the main and auxiliary devices into and out of the supply to separate and add the sheets as aforesaid, and means for causing the auxiliary devices to initiate the sheet separating and adding actions of the main devices comprising means for advancing and retracting said auxiliary and main devices relatively at predetermined intervals during their movement into and out of the supply.

2. In a sheet feeder, means for separating opposite corner portions of a sheet supply therefrom and for supporting said portions in proximity to combing means for action thereof on the sheets, said corner separating and supporting means comprising two sets of rotatable main and auxiliary devices arranged to act on said opposite corner portions of the sheet supply, means for repeatedly rotating the main and auxiliary devices into and out of the supply, and means for rotatably and repeatedly advancing and retracting said main and auxiliary devices relatively exteriorly and interiorly of the supply respectively, whereby the auxiliary devices initiate the action of the main devices, recede relative thereto out of contact with the sheets after entering the supply, and enable the main devices to solely complete the separation of the opposite corner portions of the supply from the remainder thereof.

3. In a sheet separating mechanism, rotary means for separating opposite corner portions of a sheet supply therefrom and supporting such separated portions adjacent combing means for combing action thereof on the sheets, said rotary means comprising a pair of main members arranged to act on the opposite corner portions of the sheet supply and having rounded or unsharpened sheet engaging points and a pair of auxiliary members arranged to act on said opposite corner portions of said sheet supply and having sharpened sheet separating points, means for rotating the main and auxiliary members so that said points thereof move into and out of the supply, and means for advancing and retracting said main and auxiliary members relatively during rotation thereof whereby the sharpened points of the auxiliary members initiate the action of the main members, recede relative thereto out of contact with the sheets after entering the supply, and enable said main members to solely complete the corner separating and solely produce the corner supporting operations aforesaid.

4. The combination of means adapted to separate and hold a corner portion of a supply of sheets in position for action thereon of a sheet combing device, said means comprising a main device and an auxiliary device, mechanism for repeatedly moving the main and auxiliary devices into and out of the supply, and means for repeatedly advancing and retracting the main and auxiliary devices relatively whereby the auxiliary device may initiate the separating action of the main device and thereby prevent it from damaging the sheets.

5. In a sheet feeder, means for separating a portion of a supply of sheets from the remainder thereof and comprising a main element and an auxiliary element arranged for operation on the supply, means for operating said elements to separate said portion from said supply, and means for imparting relative movement to said elements during operation thereof so that one element initiates the separating operation and the other element completes it.

6. Mechanism for separating a portion of a supply of sheets from the remainder thereof and comprising a main separating element and an auxiliary separating element cooperatively related therewith, means for repeatedly moving said elements into and out of the supply, and means for advancing and retracting said elements relatively during actuation thereof by said first named means.

7. Mechanism for separating a portion of a supply of sheets from the remainder thereof and comprising a main separating element and an auxiliary separating element cooperatively related therewith, means for repeatedly moving said elements into and out of the supply, and means for advancing the auxiliary element relative to the main element exteriorly of the supply and for retracting said auxiliary element relative to said main element interiorly of said supply.

8. Mechanism for separating a portion of a supply of sheets from the remainder thereof and comprising a rotatable main separating element and a rotatable auxiliary separating element cooperatively related and arranged coaxially for movement into and out of the supply, means for rotating said elements and moving them into and out of the supply, and means for rotatably advancing and retracting said elements relatively during rotation thereof by said first named means.

9. Mechanism for separating a portion of a supply of sheets from the remainder thereof and comprising an unsharpened main separating element and a sharpened auxiliary separating element cooperatively related therewith, means for repeatedly moving said elements into and out of the supply, and means for advancing the sharpened element relative to the unsharpened element exteriorly of the supply and for retracting said sharpened element relative to said unsharpened element interiorly of said supply.

10. In a sheet feeder of the type having a rotatable sheet separating element and means for rotating the same, a second rotatable sheet separating element associated with the first element, and means for rotating the second element with the first element and for imparting relative rotation to said elements.

11. In a sheet feeder of the type having a rotatable sheet separating element and means for rotating the same, a second rotatable sheet separating element associated with the first element, means connecting said elements for rotating the second element with the first element during rotation thereof by said first named means, and means for actuating said connecting means and imparting relative rotation to said elements.

12. In a sheet feeder of the type having a rotatable sheet separating element and means for rotating the same, a second rotatable sheet separating element associated with the first element, a lever pivoted on one element and connected with the other element for rotating the second element with the first element during rotation thereof by said first named means, and cam means for actuating said lever and imparting relative rotation to said elements.

13. In a sheet feeder of the type having a rotatable sheet separating element and means for rotating the same, a second rotatable sheet separating element associated with the first element, a lever pivoted on one element and connected with the other element for rotating the second element with the first element during rotation thereof by said first named means, a roller on the lever, and a stationary cam engaged with said roller for actuating said lever and imparting relative rotation to said elements.

14. A device of the character described comments, said second sheet separating element com- a second sheet separating element mounted on the first named element and adapted for rotation with and relative to the same to alternate the sheet separating actions of said elements.

15. A device of the character described comprising a cylindrical sheet separating element having an open end and a slotted side providing a sheet receiving pocket therein, and a second sheet separating element mounted on the cylindrical sheet separating element and adapted for rotation with and relative to the same to alternate the sheet separating actions of said elements, said second sheet seperating element comprising a sleeve provided in the periphery thereof with a slot registering with the slot in said cylindrical element and enabling the sheets to pass into and out of the pocket thereof.

16. A device of the character described comprising a cylindrical sheet separating element having an open end and a slotted side providing a sheet receiving pocket therein, said cylindrical sheet separating element being provided at the open end thereof adjacent one edge of said slot with an unsharpened or rounded sheet engaging point, and a second sheet separating element mounted on the cylindrical sheet separating element and adapted for rotation with and relative to the same to alternate the sheet separating actions of said elements, said second sheet separating element comprising a sleeve provided in the periphery thereof with a slot registering with the slot in said cylindrical element and enabling the sheets to pass into and out of the pocket thereof, said sleeve having a sharpened sheet engaging point thereon adjacent the rounded or unsharpened sheet engaging point on the cylindrical sheet separating element.

17. A device of the character described comprising a pair of cylindrical sheet separating elements one fitted on the other and both adapted to rotate in unison, a device connected with both elements, and a cam for operating said device and imparting relative rotation to said elements.

18. A device of the character described comprising a pair of cylindrical sheet separating elements one fitted on the other and both adapted to rotate in unison, one of the elements having a slot in one end thereof and the other element having a lever pivoted on the corresponding end thereof and engaged in said slot for imparting relative rotation to said elements.

19. A sheet separating element having an open end and a slot forming a sheet receiving pocket, said element being provided adjacent said open end and one edge of said slot with a rounded or unsharpened sheet engaging point.

20. A sheet separating element comprising a sleeve open at both ends and provided with a slot for entrance and exit of sheets, said sleeve being provided adjacent one of its open ends and one edge of said slot with a sharpened sheet separating point.

21. In a sheet feeder, a sheet separator, means for raising and lowering the sheet separator and on which it is pivotally mounted, adjusting means for the sheet separator movable to different positions during operation of said raising and lowering means and thereby swinging said sheet separator to different operative positions, and latch means for holding said adjusting means and the sheet separator in any of their positions aforesaid.

22. In a sheet feeder, separator raising and lowering means, a sheet separator pivoted thereon, a pivotally mounted device for adjusting the sheet separator angularly on its raising and lowering means, and latch means for said pivotally mounted device.

23. In a sheet feeder, a pivotally mounted sheet separator, pivoted means connected with the sheet separator and movable to different positions to adjust the sheet separator angularly to various operating positions, and latch means for releasably holding said pivoted means and said separator in any of said positions.

24. In a sheet feeder, a pivotally mounted sheet separator, a pivoted member connected with the sheet separator and movable to different positions to adjust the sheet separator angularly to various operating positions, and latch means for releasably holding the pivoted member and separator in any of said positions and comprising a latch element on said pivoted member and a rack having teeth with which said latch element may be selectively engaged.

25. In a sheet feeder, a pivotally mounted sheet separator, a pivoted member connected with the sheet separator and movable to different positions to adjust the sheet separator angularly to various operating positions, and latch means for releasably holding the pivoted member and separator in any of said positions, said latch means comprising a latch element on said pivoted member, a rack having teeth with which said latch element may be selectively engaged, and a spring for releasably holding the latch element engaged with the selected teeth of said rack.

26. In a sheet feeder, sheet separator operating means, a linkage connected therewith, a sheet separator mounted on a part of said linkage, a support, a latch element mounted on the support and connected with the linkage, and means for adjusting and locking the latch element and the linkage during operation of the sheet separator to thereby vary the angle of operation of said separator.

27. In a sheet feeder; a support; a sheet separating unit slidably mounted on the support for vertical adjustment and comprising a housing, separator operating means therein, and sheet separating mechanism on the housing connected with the separator operating means for operation thereby; means for adjusting the sheet separating unit vertically and comprising a shaft journalled on the housing and having threaded engagement with said support; means on the housing for operating said shaft and comprising a second shaft geared thereto and provided with a hand operating element; and driving means for the separator operating means rotatably and slidably connected therewith to provide for vertical adjustment of the sheet separating unit without disconnection of said driving means from said separator operating means.

28. In a sheet feeder; a support; a sheet separating unit slidably mounted on the support for vertical adjustment and comprising a housing, separator operating means therein, and sheet separating mechanism on the housing connected with the separator operating means for operation thereby; adjusting means on said support and the housing for vertically adjusting the sheet separating unit; means on said housing for operating said adjusting means; a power transmission unit arranged on the support for connectio with the separator operating means to drive the same; and means rotatably and slidably connecting the power transmission unit with the separator operating means to drive the same therefrom and provide for vertical adjustment of said sheet separating unit without disconnection of said power transmission unit from said separator operating means.

29. In a sheet feeder; a support; a sheet separating unit slidably mounted on the support for vertical adjustment and comprising a housing, separator operating means therein, and sheet separating mechanism on the housing connected with the separator operating means for operation thereby; adjusting means on said support and the housing for vertically adjusting the sheet separating unit; means on said housing for operating said adjusting means; a housing mounted on the support and projecting laterally therefrom; a power transmission unit arranged in the laterally projecting part of said last named housing for connection with the separator operating means to drive the same; and means rotatably and slidably connecting the power transmission unit with the separator operating means to drive the same therefrom and provide for vertical adjustment of said sheet separating unit without disconnection of said power transmission unit from said separator operating means.

30. In a sheet feeder; a support; a sheet separating unit slidably mounted on the support for vertical adjustment and comprising a housing, separator operating means therein, and sheet separating mechanism on the housing connected with the separator operating means for operation thereby; means for adjusting the sheet separating unit vertically and comprising a vertical shaft journalled on the housing and having threaded engagement with said support; means for operating said vertical shaft comprising a horizontal shaft journalled on the housing and projecting rearwardly therefrom, gearing interconnecting said shafts, and a hand operating element on the rearwardly projecting portion of the horizontal shaft; and driving means for the separator operating means rotatably and slidably connected therewith to provide for vertical adjustment of the sheet separating unit without disconnection of said driving means from said separator operating means.

31. In a sheet feeder; a support; a housing on the support projecting laterally therefrom and adjustable therealong; a power transmission unit arranged in the laterally projecting portion of the housing for connection with separator operating means to drive the same; a sheet separating unit slidably mounted on said housing for vertical adjustment relative thereto and for adjustment therewith along said support, said sheet separating unit comprising a second housing, separator operating means therein, and sheet separating mechanism on said second housing connected with the separator operating means for operation thereby; adjusting means on the two housings for vertically adjusting the sheet separating unit; means on the second housing for operating said adjusting means; means rotatably and slidably connecting the power transmission unit with the separator operating means to drive the same therefrom and provide for vertical adjustment of the sheet separating unit without disconnection of the power transmission unit from said separator operating means; and driving means for the power transmitting unit extending in its housing and rotatably and slidably connected with the power transmitting unit to provide for adjustment of the latter and the sheet separating unit along said support without disconnection of said driving means from said power transmission unit.

32. In a sheet feeder; a support; sheet separating mechanism slidably mounted on the support for vertical adjustment; a housing for movable parts of the sheet separating mechanism and vertically adjustable therewith; and means on the housing and connected with said support for slidably and vertically adjusting said sheet separating mechanism and said housing.

33. In a sheet feeder; a support; a guide secured to and depending from the support; a housing slidably mounted on the guide; sheet seprating means on the housing; operating means for the sheet separating means and having parts enclosed in said housing; and means on the housing and connected with said support for slidably and vertically adjusting said sheet separating means, said operating means, and said housing.

34. In a sheet feeder; a support; a housing slidably mounted on the support for vertical adjustment; a sheet separator on the housing; operating means for the sheet separator and having parts enclosed in the housing; means on the housing connected with the separator for adjusting it to and locking it in different operative positions; and means on the housing and connected with said support for slidably and vertically adjusting said sheet separator, said operating means, said housing, and said separator adjusting means.

35. In a sheet feeder, a cam operated rock shaft, a second shaft parallel therewith, parallel levers on said shafts and extending downwardly therefrom, a horizontal link pivotally connected with lower end portions of said levers, and sheet forwarding means mounted on said horizontal link.

36. In a sheet feeder; a driven shaft extending longitudinally of the feeder; a pair of shafts extending transversely of the driven shaft below and in spaced relation therewith; an arm on one of the pair of shafts and extending upwardly therefrom; a barrel cam on the driven shaft and engaging said arm to rock the same and its associated shaft; levers on said pair of shafts and extending downwardly therefrom; a horizontal link pivotally connected with lower end portions of said levers; and a sheet forwarding device mounted on said horizontal link.

37. In a sheet feeder, a tubular cam operated rock shaft, a second shaft parallel therewith, parallel levers on said shafts, a horizontal link pivotally connected with said levers, a vacuum type sheet forwarding device on said link, vacuum creating means connected with the tubular rock shaft to create vacuum therein, and a conduit connecting said tubular rock shaft with said sheet forwarding device.

38. In a sheet feeder; sheet separating means; a support therefor adjustable toward or away from the front of the feeder; sheet forwarding means disposed in advance of the sheet separating means; a support for the sheet forwarding means and also adjustable toward and away from the front of the feeder; connections between said supports whereby they may be simultaneously adjusted as aforesaid to likewise adjust the sheet separating and forwarding means; and means for simultaneously adjusting said supports and said sheet separating and forwarding means as a unit toward or away from the front of said feeder.

39. In a sheet feeder; sheet separating means; a support therefor adjustable toward or away from the front of the feeder; sheet forwarding means disposed in advance of the sheet separating means; a support for the sheet forwarding means and also adjustable toward and away from the front of the feeder; connections between said supports whereby they may be simultaneously adjusted as aforesaid to likewise adjust the sheet separating and forwarding means; means for simultaneously adjusting said supports and said sheet separating and forwarding means as a unit toward or away from the front of said feeder; and means for adjusting said connections to move the separating and forwarding means and their supports relatively and thereby vary the spacing between said separating and forwarding means.

40. In a sheet feeder; vacuum type sheet separating means; a support therefor adjustable toward or away from the front of the feeder; vacuum type sheet forwarding means disposed in advance of the sheet separating means; a support for the sheet forwarding means and also adjustable toward and away from the front of the feeder; connections between said supports whereby they may be simultaneously adjusted as aforesaid to likewise adjust the sheet separating and forwarding means; valve mechanism on one of the supports adjustable therewith and connected with and controlling the sheet separating and forwarding means; and means for simultaneously adjusting said supports, said sheet separating and forwarding means, and said valve mechanism as a unit toward and away from the front of said feeder.

41. In a sheet feeder; vacuum type sheet separating means; a support therefor adjustable toward or away from the front of the feeder; vacuum type sheet forwarding means disposed in advance of the sheet separating means; a support for the sheet forwarding means and also adjustable toward and away from the front of the feeder; connections between said supports whereby they may be simultaneously adjusted as aforesaid to likewise adjust the sheet separating and forwarding means; valve mechanism on one of the supports adjustable therewith and connected with and controlling the sheet separating and forwarding means; means for simultaneously adjusting said supports, said sheet separating and forwarding means, and said valve mechanism as a unit toward and away from the front of said feeder; vacuum producing means; and a conduit connecting the vacuum producing means with the valve mechanism and including rigid telescopically associated elements providing for the aforesaid adjustments without disconnection of said valve mechanism from said vacuum producing means.

42. In a sheet feeder; winding means; a support therefor adjustable toward and away from the front of the feeder to likewise adjust the winding means; valve mechanism on the support adjustable therewith and connected with and controlling the delivery of air under pressure through the winding means; and means for delivering air under pressure to the valve mechanism and including a conduit having rigid telescopically associated elements providing for the aforesaid adjustments without disconnection of said last named means from said valve mechanism.

43. In a sheet feeder; vacuum type sheet engaging means; a support therefor adjustable toward and away from the front of the feeder to likewise adjust the sheet engaging means; valve mechanism on the support adjustable therewith and connected with and controlling production of vacuum in the sheet engaging means; means for producing vacuum; and a conduit connecting the valve mechanism with the vacuum producing means and including rigid telescopically associated elements providing for the aforesaid adjustments without disconnection of said valve mechanism from said vacuum producing means.

44. In a sheet feeder; winding means and vacuum type sheet engaging means; supporting means therefor adjustable toward and away from the front of the feeder to likewise adjust said winding and sheet engaging means; spaced separate valve mechanisms on the supporting means adjustable therewith and connected with and controlling the winding and sheet engaging means respectively; means for producing vacuum and for producing air under pressure; and conduits connecting the vacuum and air pressure producing means with the air and vacuum controlling valve mechanisms respectively, said conduits each including rigid telescopically associated elements providing for the aforesaid adjustments without disconnection of said vacuum and air pressure producing means from said valve mechanisms.

45. In a sheet feeder; vacuum type sheet forwarding means adjustable toward and away from the front of the feeder; mechanism for reciprocating the sheet forwarding means and likewise adjustable, said mechanism including a tubular cam operated rock shaft; a conduit connecting the tubular rock shaft with the sheet forwarding means; valve means for controlling creation of vacuum in the tubular rock shaft, the conduit, and the sheet forwarding means; and conduit means connecting the valve means with the tubular rock shaft and providing for adjustment of said sheet forwarding means and said mechanism toward and away from the front of said feeder and toward and away from the valve means without disconnection of said valve means from said tubular rock shaft.

46. In a sheet feeder, a cam operated rock shaft, a second shaft parallel therewith, parallel levers on said shafts, a horizontal link pivotally connected with said levers, sheet forwarding means on the horizontal link, and means connecting the levers and the shafts and providing for adjustment of said levers, said link and said sheet forwarding means as a unit along said shafts.

47. In a sheet feeder, a tubular cam operated rock shaft, a second shaft parallel therewith, parallel levers on the shafts, a horizontal link pivotally connected with the levers, vacuum type sheet forwarding means on the link, means connecting the levers and the shafts and enabling adjustment of said levers, said link and the sheet forwarding means along said shafts, vacuum producing means connected with the tubular cam operated rock shaft, and conduit means connecting sail tubular cam operated rock shaft with said sheet forwarding means and providing for the adjustment aforesaid.

EDWIN W. GOODWIN.

CERTIFICATE OF CORRECTION.

Patent No. 2,208,304. July 16, 1940.

EDWIN W. GOODWIN.

It is hereby certified that error appears in the printed specification of the above numbered patent requiring correction as follows: Page 12, first column, lines 62 and 63, claim 14, for "comments, said second sheet separating element com-" read --comprising a rotatable sheet separating element and--; page 15, second column, line 21, claim 47, for the word "sail" read --said--; and that the said Letters Patent should be read with this correction therein that the same may conform to the record of the case in the Patent Office.

Signed and sealed this 10th day of September, A. D. 1940.

(Seal)

Leslie Frazer,
Acting Commissioner of Patents.